(12) United States Patent
Waas

(10) Patent No.: US 7,380,867 B2
(45) Date of Patent: Jun. 3, 2008

(54) CAMPER-UTILITY TRAILER ASSEMBLIES

(76) Inventor: Donald A. Waas, 2113 Railroad St., New Holstein, WI (US) 53061

( * ) Notice: Subject to any disclaimer, the term of this patent is extended or adjusted under 35 U.S.C. 154(b) by 214 days.

(21) Appl. No.: 11/084,337

(22) Filed: Mar. 17, 2005

(65) Prior Publication Data

US 2006/0208531 A1 Sep. 21, 2006

(51) Int. Cl.
*B60P 3/335* (2006.01)
(52) U.S. Cl. ............... 296/169; 296/159; 296/161; 296/172; 296/173
(58) Field of Classification Search ............ 296/161, 296/168, 169, 172, 173, 159, 176, 174; 135/88.01, 135/88.13, 88.18
See application file for complete search history.

(56) References Cited

U.S. PATENT DOCUMENTS

| | | | | |
|---|---|---|---|---|
| 1,185,981 | A * | 6/1916 | Campbell | 135/121 |
| 2,225,993 | A * | 12/1940 | Hornberger | 296/161 |
| 2,826,210 | A * | 3/1958 | Heil | 135/132 |
| 2,853,338 | A * | 9/1958 | Stanley | 296/173 |
| 3,375,836 | A * | 4/1968 | Domeneghetti | 135/88.18 |
| 3,466,082 | A * | 9/1969 | Branch | 296/164 |
| 3,582,131 | A * | 6/1971 | Brown | 296/26.02 |
| 3,599,651 | A * | 8/1971 | Perry | 135/139 |
| 3,697,122 | A * | 10/1972 | Richards | 296/173 |
| 3,702,617 | A * | 11/1972 | Franzen | 135/88.18 |
| 3,743,345 | A * | 7/1973 | Eckman et al. | 296/163 |
| 3,756,649 | A * | 9/1973 | Wines | 296/161 |
| 3,826,270 | A * | 7/1974 | Hentges | 280/19.1 |
| 3,945,659 | A | 3/1976 | Brown | |
| 4,057,283 | A * | 11/1977 | Barnett | 296/173 |
| 4,079,956 | A * | 3/1978 | Headington, Jr. | 280/203 |
| 4,088,363 | A * | 5/1978 | Palmer | 296/161 |
| 4,109,954 | A * | 8/1978 | Wall | 296/161 |
| 4,194,785 | A * | 3/1980 | Cox et al. | 296/169 |
| 4,195,877 | A * | 4/1980 | Duda | 296/172 |
| 4,294,484 | A * | 10/1981 | Robertson | 296/156 |
| 4,310,195 | A * | 1/1982 | Huff | 296/173 |
| 4,465,316 | A * | 8/1984 | Roisen | 296/161 |
| 4,657,299 | A * | 4/1987 | Mahan | 296/159 |
| 4,729,594 | A * | 3/1988 | Hoff | 296/161 |
| 4,826,235 | A * | 5/1989 | Zwick | 296/170 |
| 5,205,089 | A * | 4/1993 | Cunningham | 52/79.1 |
| 5,419,607 | A * | 5/1995 | Oliveira | 296/159 |
| 5,462,330 | A | 10/1995 | Brown | |
| 5,642,330 | A | 6/1997 | Santopietro | |
| 5,660,425 | A * | 8/1997 | Weber | 296/163 |
| 5,738,130 | A * | 4/1998 | Thomas | 135/88.13 |
| 5,931,176 | A * | 8/1999 | Isler et al. | 135/88.15 |
| 5,988,731 | A | 11/1999 | Eischen | |
| 6,070,925 | A * | 6/2000 | Moldofsky | 296/26.08 |

(Continued)

*Primary Examiner*—Dennis H. Pedder
*Assistant Examiner*—Gregory Blankenship
(74) *Attorney, Agent, or Firm*—Wilhelm Law Service; Thomas J. Connelly

(57) ABSTRACT

A camper-utility trailer assembly has a convertible trailer and at least one enclosure structure communicating therewith. The convertible trailer is convertible between a stowed configuration and a set-up configuration. In at least one of the configurations, the convertible trailer has at least one flexible shelf extending laterally therefrom. The flexible shelf is adapted and configured to be rollingly collapsed down e.g. for stowage in a receptacle beside the outer surface of a sidewall of the convertible trailer. The at least one enclosure structure can generally overlie the convertible trailer and flexible shelf and/or can generally overlie a portion of the ground adjacent the convertible trailer.

25 Claims, 8 Drawing Sheets

U.S. PATENT DOCUMENTS

| | | | |
|---|---|---|---|
| 6,102,468 A * | 8/2000 | Lowrey et al. | 296/173 |
| 6,283,537 B1 | 9/2001 | DeVore, III | |
| 6,394,118 B1 * | 5/2002 | Cikanowick et al. | 135/88.06 |
| 6,439,647 B1 * | 8/2002 | Baldwin | 296/165 |
| 6,669,269 B1 * | 12/2003 | Tran-Ngoc | 296/156 |
| D484,942 S * | 1/2004 | Rapaport et al. | D21/834 |
| 6,712,422 B1 * | 3/2004 | Vaillancourt | 296/165 |
| 6,725,807 B1 * | 4/2004 | Tapia | 119/496 |
| 6,739,617 B1 * | 5/2004 | Martin | 280/656 |
| 6,910,492 B1 * | 6/2005 | Stuck | 135/88.15 |
| D516,497 S * | 3/2006 | Napieraj | D12/403 |
| 7,165,779 B2 * | 1/2007 | Badger et al. | 280/656 |
| 7,178,857 B2 * | 2/2007 | Williams | 296/173 |
| 2003/0173758 A1 | 9/2003 | Badger et al. | |
| 2003/0184055 A1 | 10/2003 | Badger et al. | |

* cited by examiner

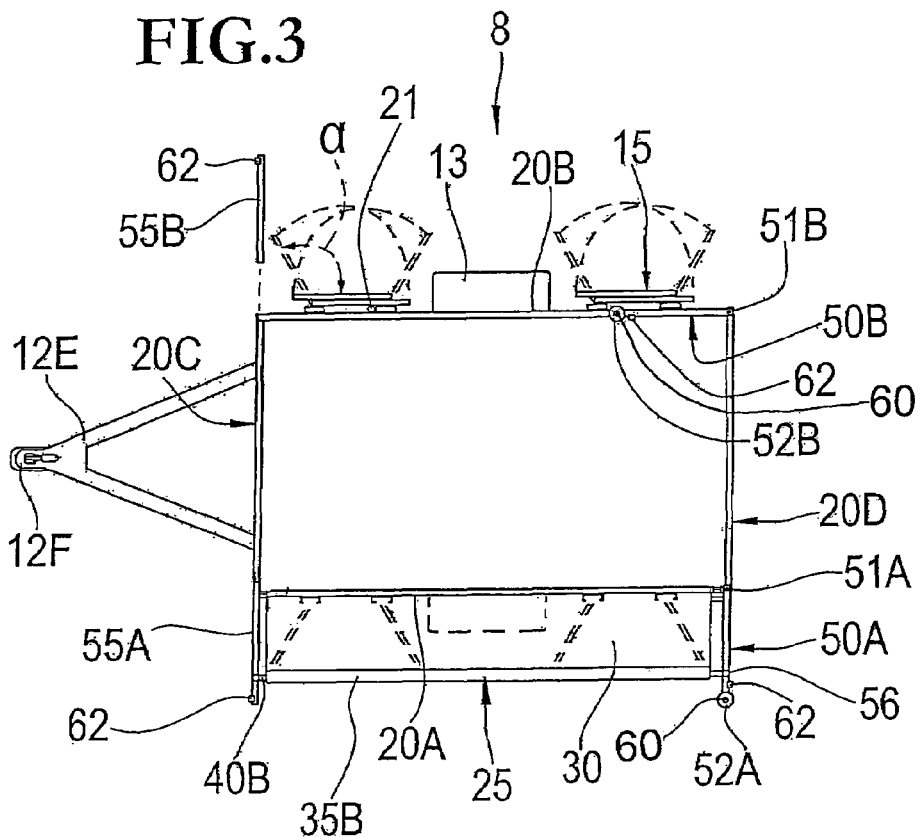

CAMPER-UTILITY TRAILER ASSEMBLIES

BACKGROUND

This invention relates to utility trailers and recreational e.g. camping trailers. Specifically, this invention relates to multi-functional utility and relatively light-weight camping trailers.

Light weight camping trailers are addressed first. Conventional light-weight camping trailers are typically of a "pop-up" design. Namely, these "pop-up" campers typically have a rigid body shell, a rigid roof-wall, and flexible side panels. The roof-wall is adapted and configured to actuate between a first, lowered/closed, position and a second, raised/opened, position.

The flexible side panels are attached to both the rigid body shell and the rigid roof-wall of the camper. When the roof-wall is raised to the raised/opened position, the flexible side panels are raised to a corresponding raised/opened position, whereby the side panels extend generally upwardly from the sidewalls of the rigid body shell. The portions of the flexible side panels which are adjacent the front and back ends of the "pop-up" camper typically expand outwardly from the rigid body shell, thereby to expand the projected footprint of the camper, and to provide sleeping quarters, for users of the camper, which extend outwardly from the projected footprint of the rigid body/shell.

However, when the roof-wall is in the lowered/closed position, the flexible side panels are stored, e.g. generally folded up, within the rigid body shell and under the roof-wall. Since the roof-wall is rigid, and since it spans across generally the entire upper perimeter of the rigid body shell, a user is unable to e.g. load equipment and/or other articles into the trailer from the "top" of the trailer. Thus, a user must rely on the storage compartments (if any) built into the rigid body shell for storage of such articles. Or, the user must load such articles into the interior portion of the camper through the door of the camper, which can be a relatively difficult task when the equipment and/or other articles to be loaded are large, bulky, and/or otherwise cumbersome. Loading these articles proves even more difficult for a user when the roof-wall of the camper is in the lowered/closed position.

Next, light weight utility trailers are addressed. Typical utility trailers have a platform, e.g. a bottom wall, sometimes known as the trailer bed, and a plurality of sidewalls which extend upwardly from the bottom wall. Since utility trailers typically do not have a top, lid-type structure, e.g. a top wall or cover, a user can load equipment and/or other articles through the upper opening into the open-top box of the utility trailer. This enables a user to load equipment and/or other articles, even those that are large, bulky, and/or otherwise cumbersome, into the trailer by merely lowering or dropping, or e.g. horizontally sliding, the equipment and/or other articles into the trailer. However, utility trailers do not provide any enclosure structure, and are thus not well suited for use as e.g. a camper, where the people expect to be kept dry, and optionally warm.

Accordingly, it is desirable and/or valuable to provide multi-functional utility trailers, e.g. camper-utility trailers, which selectively, as desired by a user, provide camping enclosure features in addition to utility trailer functionality.

It is also desirable and/or valuable to provide camper-utility trailers which can be loaded from the top, and which have storable, optionally flexible, shelves which can be used as sleeping bunks.

SUMMARY

This invention provides a camper-utility trailer assembly which includes a convertible trailer and at least one enclosure structure communicating with the trailer. The convertible trailer is convertible between at least first and second configurations. In at least one of the configurations, the convertible trailer has at least one shelf, such as a fabric bunk bed extending laterally therefrom and supported from the trailer frame, or from a sidewall of the trailer. The shelf is adapted and configured to be collapsed down e.g. for storage against a sidewall, e.g. an outer surface of the sidewall, of the trailer. The at least one enclosure structure can generally overlie the convertible trailer and the shelf, and/or can generally overlie a parcel of ground adjacent the convertible trailer; and the portion over the ground can be at least in part supported from the ground, and laterally supported by the trailer.

In a first family of embodiments, the invention comprehends a camper-utility trailer assembly, comprising a trailer having a front and a rear, a trailer bottom wall with first and second lateral outer edges which generally define the outermost lateral edges of the trailer bottom wall, first and second trailer sidewalls extending generally upwardly from respective ones of the first and second lateral outer edges of said trailer bottom wall; at least first and second hinge arms, mounted for pivotation about respective first and second upright axes, with respect to at least one of the trailer sidewalls; and at least one shelf removably attachable to the hinge arms at the respective trailer sidewall and extending generally away from the respective trailer sidewall.

In some embodiments, the at least one shelf is movable between a first stowed position and configuration, and a second set-up position and configuration, wherein the at least one shelf in the stowage position and configuration generally defines a rolled-up configuration in which the at least one shelf is generally rolled about itself, and wherein, when the at least one shelf is in the set-up position and configuration, at least part of the length of the shelf generally extends in a generally straight line path from proximate at least one of the trailer sidewalls.

In some embodiments, the shelf is a flexible shelf which is generally free from residual bending stress after being bent.

In some embodiments, the invention comprises a second flexible shelf extending outwardly from the second sidewall.

In some embodiments, the invention further comprises a trailer enclosure communicating with the shelf and overlying a major portion, optionally all, of the trailer bottom wall.

In some embodiments, the invention further comprises one or more rear arms extending outwardly from the trailer sidewall or sidewalls, at the rear of the trailer, the rear arm or arms communicating with the respective at least one shelf.

In some embodiments, the trailer is at least temporarily fixed in location, and the camper-utility trailer assembly further comprises a ground enclosure laterally supported from the trailer and set up adjacent the trailer.

In some embodiments, the trailer is at least temporarily fixed in location, and further comprises a ground enclosure laterally supported from the trailer and set up adjacent the trailer, the trailer enclosure and the ground enclosure communicating with each other.

In some embodiments, the ground enclosure comprises a frame, the frame comprising upright supports adjacent the trailer, and gable bars connected to the upright supports by pivotation brackets, the pivotation brackets accommodating pivotation of the gable bars with respect to the upright bars, about generally horizontal axes.

In some embodiments, the hinge arms each pivot about a fixed radius and, on a given sidewall, extending outwardly at first and second angles, which angles have angle apexes pointing in generally opposing directions.

In some embodiments, the invention further comprises support structure adjacent a respective sidewall of trailer, thereby to define a receiver between the support structure and the respective sidewall, a first end of the flexible shelf extending into the receiver such that, when the shelf is rolled up in the stowage configuration, the shelf is readily stowed in the receiver.

In some embodiments, the shelf comprises a flexible shelf, and the invention further comprises tightening structure, such as bolt-nut combinations, effective to tighten the flexible shelf after the shelf has been erected to the set-up configuration.

In a second family of embodiments, the invention comprehends a camper-utility trailer assembly, comprising a trailer having a front and a rear, a bottom wall, and first and second sidewalls extending generally upwardly from the bottom wall; and at least one flexible shelf, made from flexible material which can be rolled about itself in a tight roll accompanied by little or no residual restorative bending stress, the at least one flexible shelf being movable between a stowage location and configuration and a set-up location and configuration, the flexible shelf in the stowage location and configuration generally extending a first relatively lesser distance outwardly away from the respective one of the sidewalls, and in the set-up location and configuration generally extending a second relatively greater distance from the respective one of the plurality of sidewalls.

In some embodiments, the trailer assembly comprises a plurality of hinge arms mounted for pivotation, about an upright axis and away from and toward a respective one of the trailer sidewalls.

In some embodiments, ones of the plurality of hinge arms being mounted for pivotation in opposing directions from the stowage location and configuration.

In some embodiments, the flexible shelf in the set-up location and configuration communicates with at least first and second ones of the hinge arms which are mounted for pivotation in such opposing directions.

In some embodiments, the invention further comprises a trailer enclosure communicating with the at least one flexible shelf and overlying a major portion of the trailer bottom wall.

In some embodiments, the invention further comprises at least one rear arm extending outwardly from a respective trailer sidewall at the rear of the trailer, the at least one rear shelf arm communicating with the respective one of the at least one flexible shelf.

In a third family of embodiments, the invention comprehends a camper-utility trailer assembly which is adapted to be at least temporarily fixed in location. The camper-utility trailer assembly comprises a trailer having a bottom wall, and first and second sidewalls extending generally upwardly from the bottom wall; and first and second distinct enclosures communicating with the trailer; the first enclosure generally overlying the trailer, and the second enclosure being generally adjacent the trailer, the first and second enclosures being releasably attached to each other.

In some embodiments, the invention further comprises first and second pivotable hinge arms adapted to be extended, by pivotation, outwardly away from the sidewalls, the trailer comprising at least one flexible shelf removably attached to the pivotable hinge arms so as to extend generally outwardly away from ones of the trailer sidewalls.

In some embodiments, the invention further comprises first and second flexible shelves extending outwardly from proximate the first and second sidewalls.

In some embodiments, the flexible shelf is movable between a relatively stowed position and a relatively set-up position, and is adapted and configured to be generally longitudinally rolled about itself so as to be rolled up as the flexible shelf is being moved from such set-up position to such stowed position.

In some embodiments, a first enclosure overlies a major portion of the bottom wall of the trailer, and optionally the invention comprises an enclosure tunnel generally spanning between and connecting the first and second enclosures to each other.

In a fourth family of embodiments, the invention comprehends a camper-utility trailer assembly which is adapted to be at least temporarily fixed in location. The camper-utility trailer assembly comprises a trailer having a bottom wall, and first and second sidewalls extending generally upwardly from the bottom wall; and an enclosure communicating with the utility trailer. The enclosure generally overlies the trailer and is supported in part by the trailer. A portion of the enclosure extends beyond the trailer and is supported from the ground adjacent the trailer.

In a fifth family of embodiments, the invention comprehends a kit adapted and configured to convert a utility trailer to a camper trailer, which can receive thereon, or attached thereto, at least one enclosure which cooperates with such trailer in establishing a camping-type enclosure. The kit comprises at least first and second pairs of hinge arms which can be mounted to the trailer, such that each pair of hinge arms can pivot about respective first and second upright axes; a lower side rail adapted to be attached to a side of such trailer; an upper side rail adapted to be attached to a side of such trailer, above the lower side rail; and at least one shelf which is adapted to be mounted to at least one of the lower side rail or to the trailer, and to be extended to a locus displaced from such trailer where the shelf can be temporarily attached to at least first and second ones of the hinge arms, thus to provide a shelf which is adapted to receive a load thereon.

In some embodiments, the kit further comprises a front upper rail, front arms, and rear arms.

In some embodiments, the kit further comprises at least one enclosure, optionally two enclosures, adapted to be attached to other elements of the kit, thereby to mount the enclosure, or enclosures, relative to the trailer.

BRIEF DESCRIPTION OF THE DRAWINGS

FIG. 3 shows a top view of the convertible camper-utility trailer of FIG. 2 with one shelf assembly set up.

FIG. 4 shows an enlarged, exploded, view of the hinge assembly illustrated in FIG. 2.

Figure 1:
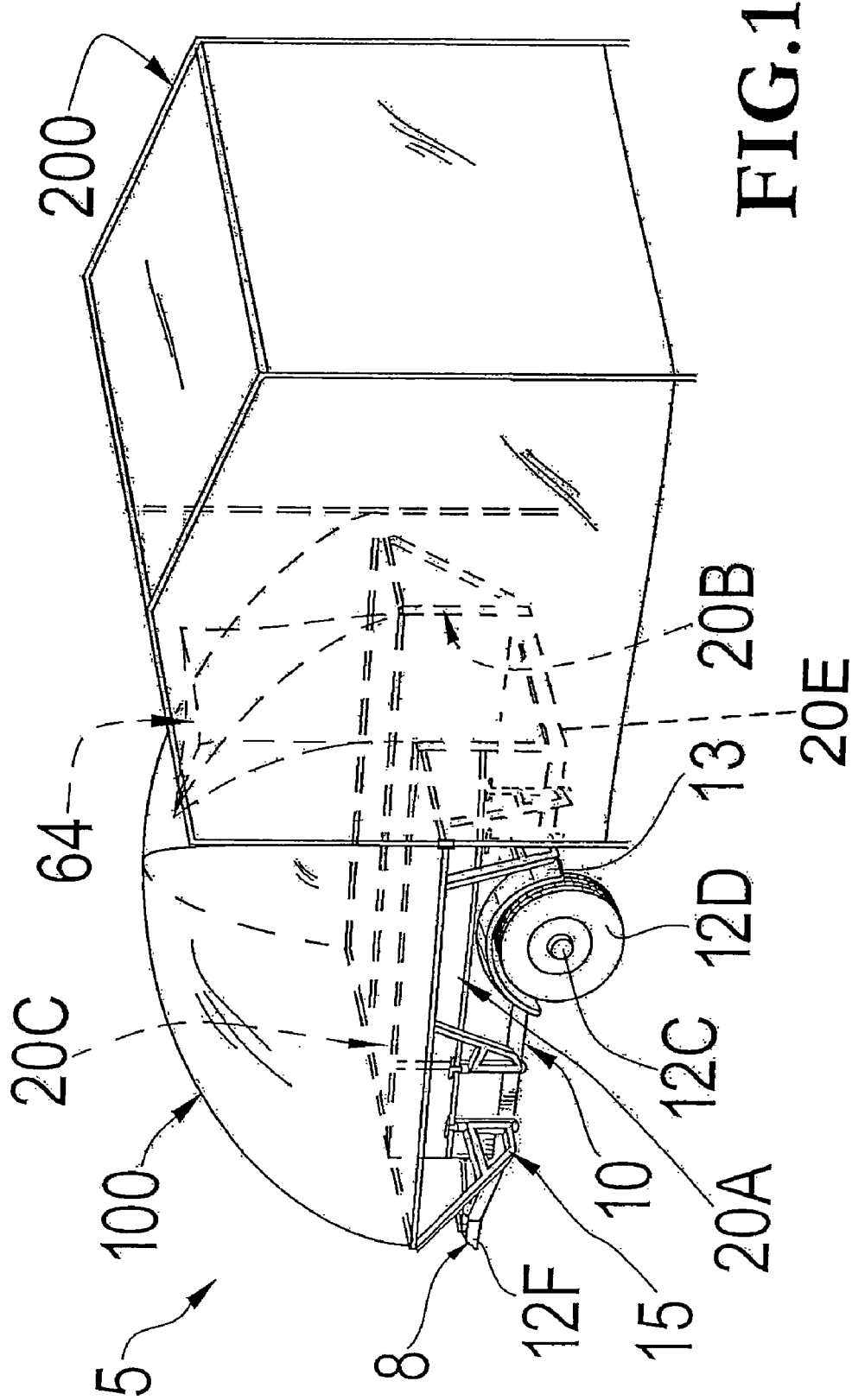
FIG. 1 shows a pictorial view of a first embodiment of convertible camper-utility trailers of the invention including first and second set-up enclosures.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

FIG. 1 illustrates a first embodiment of camper-utility trailers of the invention. In a typical implementation of the invention, a camper-utility trailer assembly 5 includes convertible trailer 8, and one or more enclosure structures e.g. trailer enclosure 100 and/or ground enclosure 200, for example a tent enclosure. Various ones of the components of camper-utility trailer assembly 5 enable a user to realize multiple functionalities from the overall assembly.

Namely, camper-utility trailer assembly 5 enables a user to generally, for example, utilize convertible trailer 8 as though it were a typical utility trailer, such as to haul various articles and goods therein. As another example, camper-utility trailer assembly 5 enables a user to generally utilize the assembly as though it were a typical camper trailer, such as for recreational and/or camping purposes, thereby to generally separate the user from the ambient environment and to provide at least some protection from the environmental elements.

As illustrated in FIG. 1, camper-utility trailer assembly 5 provides at least one enclosure which communicates with convertible trailer 8. Accordingly, a user of camper-utility trailer assembly 5 can use either trailer enclosure 100 or ground enclosure 200 as structure in which to sleep, lodge, camp, and/or otherwise to use as a base of operations for various recreational or other activities. The proximity of trailer enclosure 100 and ground enclosure 200 to trailer 8 enables a user of camper-utility trailer assembly 5 to have relatively easy access to any gear, goods, or other articles which are stored in trailer 8.

Generally, trailer 8 includes running gear 10, first 20A and second 20B sidewalls, front wall 20C, rear wall 20D (FIG. 3) such as a tailgate, and bottom wall 20E which is also known as the trailer bed. Running gear 10 includes a frame, including frame rails 12A, as well as springs 12B, see FIG. 2. axle 12C, wheel assembly 12D, tongue 12E, see FIG. 2. coupler 12F, and fender 13.

Figure 2:
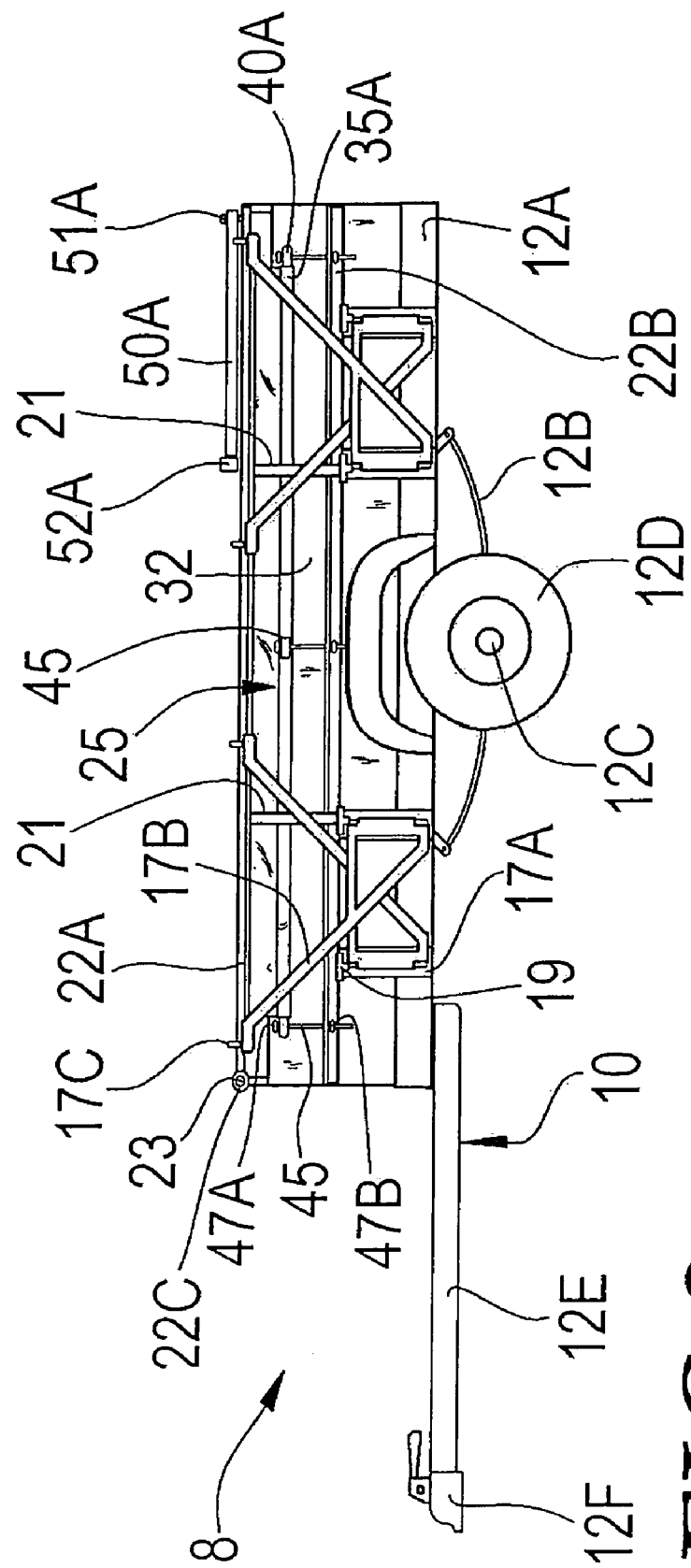
FIG. 2 shows a side elevation view of the convertible camper-utility trailer of FIG. 1.

Referring to FIG. 2, trailer 8 includes the conversion apparatus which is used to convert the trailer to the camper configuration. The conversion apparatus includes upper siderail 22A, lower siderail 22B, front upper rail 22C, at least one shelf assembly 25, rear arms 50A, 50B see FIG. 3, and front arms 55A, 55B see FIG. 3.

Returning now to the running gear, frame rail 12A is an elongate, rigid, structural member. Frame rail 12A has a length which generally corresponds to the overall length of convertible trailer 8 (FIG. 1). Although only one frame rail 12A is seen in FIG. 2, running gear 10 can include more than one frame rail 12A, e.g. one frame rail adjacent each of the two outer lateral portions of running gear 10.

In addition, running gear 10 includes, as desired, elongate, rigid, preferably metallic cross-members which attach ones of the frame rails 12A to each other. As one example, running gear 10 further includes cross-members which span generally transversely between, and are attached to each of, the frame rails 12A. Frame rails 12A, alone or in combination with frame rail cross-members, generally define the "skeletal structure," e.g. at least part of the "frame" of running gear 10.

Those skilled in the art are well aware of suitable materials for frame rails 12A and/or the frame rail cross-members, including, but not limited to, steel, aluminum, and/or otherwise metallic tubing, bar stock, angle-iron stock, channel-iron stock, I-beam stock, and others.

The side elevation view of FIG. 2 illustrates only one side of trailer 8, yet the other, non-illustrated, side of trailer 8 is substantially identical to, namely a mirror image of, and/or has substantially the same components as, the side which is illustrated and thus visible in FIG. 2. Thus, the right and left sides of the trailer are generally analogues of each other. Accordingly, the discussion of FIG. 2 refers specifically to the components visible in the FIGURE, but it is recognized that all, or substantially all, of the components of the visible side of trailer 8 have like components which are present on the side of trailer 8 which is hidden from view in FIG. 2.

Referring to FIG. 2, side panel 32 is generally planar and has a length dimension and a height dimension, an inwardly facing surface and an outwardly facing surface. Panels 32, on the left and right sides of the trailer, collectively, generally define the sidewalls of trailer 8, e.g. sidewalls 20A, 20B (FIG. 1), and each such panel 32 extends generally upwardly from the respective frame rail 12A or other structural element of running gear 10. In other words, panels 32 are oriented and positioned on edge, whereby they extend generally upwardly, and generally perpendicular to the ground on which the trailer is supported. Collectively, panels 32, bed 20E, front wall 20C, and rear wall 20D at least partially define the trailer box which is adapted and configured to carry various articles, goods, and/or other cargo therein.

Those skilled in the art are well aware of suitable materials for use as panels 32 and other members of the trailer box, including certain metallic materials such as steel and/or steel alloy sheet material, aluminum and/or aluminum alloy sheet material, and certain non-metallic materials such as wooden sheet material e.g. plywood, particle board, sawn dimension lumber, and other non-metallic materials such as certain suitable polymeric materials.

Axle 12C has first and second terminal ends and defines a length therebetween. The length of axle 12C extends generally perpendicular to the length of trailer 8. Axle 12C is adapted and configured to enable certain components thereof to rotate relatively freely. A typical configuration of axle 12C includes, but is not limited to, a relatively fixed and hollow axle-tube which houses bearings journalled to a rotatable axle shaft. The terminal ends of the rotatable axle shaft each include a flange mounted thereto, which enables e.g. wheel assembly 12D to be fixedly mounted to the axle shaft, whereby the wheels and the axle shaft can rotate together, relative to the axle tube. The axle tube is fixedly mounted to respective elements of the frame such as frame rails 12A.

Axle 12C is attached to springs 12B and thus indirectly to other elements of the running gear. Thus, when springs 12B compress, the remainder of the running gear moves relatively nearer to axle 12C. And when springs 12B extend, the remainder of the running gear moves relatively further from axle 12C.

Wheel assembly 12D includes a wheel which has an outer circumferential surface and illustratively a bore which extends axially through a medial portion thereof. A tire, e.g. a pneumatic or other tire, is mounted to the outer circumferential surface of the wheel and at least one bearing assembly is housed in e.g. a wheel hub which is attached to, or otherwise communicates with, the inner circumferential surface of the wheel.

The bore which extends through the wheel assembly, e.g. the wheel bore, and end of the rotating axle shaft are cooperatively adapted and configured so that a portion of the terminal end of the axle shaft extends to and/or through the wheel bore. When the axle shaft is e.g. inserted through the wheel bore, the hub on the rotating axle shaft interfaces with the surface of the wheel which faces inwardly toward the frame rails 12A. The hub and the wheel are attached to each other, for example, at least partially through a threaded cooperation between threaded posts, which extend from the flange, and lug-nuts. Thus, wheel assembly 12D is generally fixed in rotational unison with the rotating components of axle 12C.

Wheel assembly 12D can, as known to those skilled in the art, be attached to axle 12C without necessity of using any bore in the wheel assembly.

Tongue 12E extends along a portion of the length of running gear 10 and thus along a portion of the length of trailer 8. Tongue 12E has first and second ends. The first end of the tongue 12E is attached to a frame rail 12A, or other frame element. The tongue 12E extends, from its first end, generally frontwardly in the trailer, 8 and beyond front wall 20C to the second end of the tongue 12E. Coupler 12F is attached to the second end of the tongue 12E.

As illustrated in FIG. 3, tongue 12E can include two or more elongate members. At the intersection of tongue 12E and frame rails 12A, the two or more elongate members which define tongue 12E are separated from each other. In other words, the two or more tongue members intersect and are attached to the frame rails 12A or other frame elements at two separate, distinct, transversely-spaced points of intersection. From these distinct points of intersection, the two tongue members extend toward each other, and intersect each other adjacent coupler 12F. Thus, as viewed from above, and illustrated in FIG. 3, the tongue members collectively define a generally triangular profile of tongue 12E. The intersection between the tongue members and the respective frame elements can be at, frontwardly of, or rearwardly of, front wall 20C.

In some embodiments, tongue 12E is a single, elongate frame member, and which extends between the frame member and coupler 12F.

Fender 13 is generally arcuate, in side profile, and is adapted and configured to at least partially cover, and thus guard or protect, wheel assembly 12D. Thus, fender 13 defines a radius which is generally greater in magnitude than the magnitude of the radius of wheel assembly 12D.

Referring now to FIGS. 1, 2, 3, and 4, each of hinge assemblies 15 is attached to trailer 8, namely to sidewalls 20A, 20B (FIG. 1) of trailer 8, or to one or more elements of running gear 10. Each hinge assembly 15 includes hinge bracket 17A, hinge arm 17B, arm pin 17C, upper bracket barrel 18A, lower bracket barrel 18B, arm barrel 18C, and hinge pin 19.

Hinge brackets 17A each include a mounting flange which faces, and facilitates mounting to, the respective side wall 20A or 20B of the trailer, using e.g. conventional bolts. For example, a length of angle iron can provide a first flange which faces the side wall and a second flange which extends perpendicular to, e.g. laterally away from, the side wall. The second flange can receive upper and lower bracket barrels 18A, 18B e.g. by welding. The hinge brackets 17A are thus attached to sidewall 20A or 20B and extend generally upwardly from e.g. frame rails 12A and laterally outwardly a short distance from the respective side wall 20A, 20B. Each hinge bracket 17A thus has a height dimension, an inwardly facing surface, and an outwardly facing edge. The inwardly facing surface of each hinge bracket 17A faces inwardly toward, and communicates with, an outwardly facing surface of either sidewall 20A or sidewall 20B.

In the alternative, hinge brackets 17A can be mounted to more structural e.g. frame members of the trailer running gear whereby the hinge brackets 17A need not interface directly with sidewalls 20A or 20B.

The outwardly facing edge of each hinge bracket 17A faces outwardly away from the respective sidewall 20A or 20B to which the hinge bracket 17A is mounted. In other words, the outwardly facing edge of each hinge bracket 17A faces generally outwardly away from the remainder of trailer 8.

Hinge arm 17B includes an inner member 34, an outer member 36, a lower member 37, and an upper member 38, as well as a plate 39 which fills the opening between the inner and outer, and the upper and lower, members of the hinge arm 17B. Hinge arm 17B is pivotably attached to hinge bracket 17A, by hinge pin 19, so as to pivot with respect to bracket 17A.

As illustrated in the exemplary embodiment of FIG. 4, outer member 36 extends angularly upwardly from lower member 37, to and beyond the upper member 38. Also, as illustrated, the lower member 37 is a horizontal bar which extends generally parallel to the ground, from the inner member 34 to the outer member 36. Inner member 34 is aligned with upper and lower bracket barrels 18A, 18B, and has a bore therethrough so as to receive hinge pin 19, whereby hinge arm 17B is hingedly mounted for hinged articulation with respect to hinge bracket 17A. In the illustrated embodiments, plate 39 optionally spans the space between the upper member 38, the lower member 37, the inner member 34, and the outer member 36. Such plate 39 offers enhanced rigidity and other structural strength, including resistance to e.g. downward flexing under loads experienced by hinge arm 17B.

Although hinge arm 17B is illustrated as having an angularly and upwardly extending elongate outer member 36, in some embodiments, hinge arm 17B does not have gusseting and still is sufficiently strong and durable to perform its desired function, and sufficiently resists downward flexing under load. In such embodiments, hinge arm 17B can include an upright member which includes barrel 18C, which receives hinge pin 19, in alignment with the upper and lower bracket barrels 18A, 18B, as well as including an elongate hinge arm 17B which is rigidly mounted to, or integral with, the upright member and which can extend e.g. horizontally outwardly from the top of the upright member. Hinge arm 17B is thus hingedly mounted for pivotation, to hinge bracket 17A. Such simpler hinge arm 17B may, or may not, include angle bracing between the horizontal member and the upright member. Such hinge arm structures are illustrative only, and other hinge arm structures can readily be devised.

Figure 6:
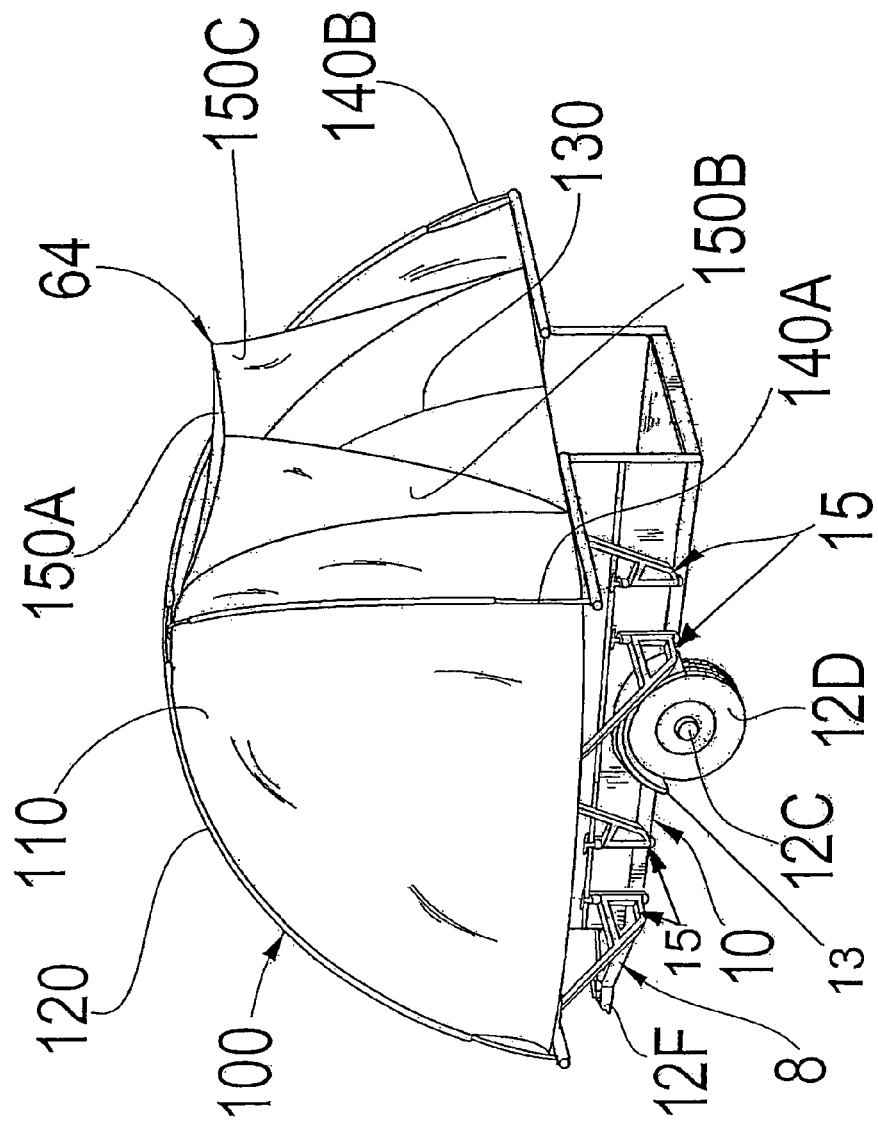
FIG. 6 shows a pictorial view of the embodiment of the convertible camper-utility trailer of FIG. 1, having a single set-up enclosure over the trailer.

In the illustrated embodiments, see Fig. 6, four hinge assemblies 15 are indicated on each side of trailer 8, a first pair of hinge assemblies in front of fender 13 and a second pair of hinge assemblies to the rear of fender 13. The two hinge assemblies 15 of each such pair can work together, and the four hinge assemblies 15 on a given side of the trailer 8 collectively work together. Optionally, the hinge brackets 17A in a given pair can be rigidly mounted to each other such as by spacing bars, or a plate, (not shown) which span the distance between the respective hinge brackets 17A, thereby to fix the spatial relationship between brackets 17A of a given pair of brackets.

Irrespective of the specific structure of the hinge arm 17B and considering a generally planar direction of extension of hinge arm 17B, and irrespective of any connections between hinge brackets 17A, a hinge arm 17B, when fully pivoted outward from e.g. sidewall 20A or 20B of the trailer 8, extends at an obtuse angle to the respective sidewall 20A, 20B as shown in dashed outline in FIG. 3, relative to the stowed arm configuration shown in solid outline on one side of the trailer in FIG. 3. The stowed configuration is also shown in FIG. 2.

Arm pin 17C represents a generally cylindrical upward projection, such as a bolt or stud, at the end of outer frame member 36. The arm pin 17C has a length and a width, and extends upwardly from outer frame member 36 of hinge arm 17B. Thus, arm pin 17C extends from the upper surface of outer frame member 36 at a location most remote from hinge bracket 17A when hinge arm 17B is fully pivoted into its set-up use configuration. Arm pin 17C is adapted and configured to interface with other components of camper-utility trailer assembly 5, e.g. shelf assembly 25. see Fig. 2. Accordingly, arm pin 17C enables a user to, as desired, attach and/or otherwise interface a respective hinge arm 178 and thus hinge assembly 15 to shelf assembly 25, thus to support the shelf assembly 25 in the set-up configuration of the shelf assembly 25.

Hinge bracket hA and hinge arm 17A are hingedly connected to each other through the interfacing and communication between upper and lower bracket barrels 18A, 188, arm barrel 18C, and hinge pin 19.

Each of upper and lower bracket barrels 18A, 18B, shown in the illustrated embodiments, is a generally tubular member, having a generally constant-magnitude outer diameter, and a length and a width defined along the outer diameter; each of bracket barrels 18A, 18B having a through bore which extends through the barrel and axially along the length of the barrel. Upper bracket barrel 18A is attached to an upper portion of the second flange of the e.g. angle iron of hinge bracket 17A. The length of upper bracket barrel 18A extends generally parallel to the upwardly-oriented length of hinge bracket 17A, whereby upper bracket barrel 18A is generally vertical or upright with respect to the ground.

Lower bracket barrel 18B is attached to a lower portion of the second flange of the e.g. angle iron, of hinge bracket 17A, whereby upper and lower bracket barrels are separated by a distance therebetween. Like upper bracket barrel 18A, the length of lower bracket barrel 18B extends generally parallel to the length of hinge bracket 17A, whereby lower bracket barrel 18B is generally vertical or upright with respect to the ground. The through bores of upper and lower bracket barrels 18A, 18B are in general axial alignment with each other.

Arm barrel 18C is e.g. a generally cylindrical member having a generally constant outer diameter extending along the length of the barrel. Arm barrel 18C is shown as being integral with hinge arm 17B, and at least partially defines the inner, hingedly mounting portion of hinge arm 17B. The through bore extends axially through arm barrel 18C. The length of the arm barrel 18C which is shown corresponds generally to the distance between upper and lower bracket barrels 18A, 18B. In the complete assemblage of hinge assembly 15, arm barrel 18C is pivotably mounted to, and longitudinally confined between, upper bracket barrel 18A and lower bracket barrel 18B, by hinge pin 19. Also, in the complete assemblage of hinge assembly 15, the respective through bores of upper bracket barrel 18A, lower bracket barrel 18B, and arm barrel 18C are generally in coaxial alignment with each other so as to collectively receive hinge pin 19.

Hinge pin 19 includes pin head 19H and pin shaft 19S. Pin shaft 19S is shown as being generally cylindrical and elongate, has upper and lower terminal ends and defines a length dimension therebetween. Pin shaft 19S preferably has a generally smooth outer circumferential surface and defines, at least in part, a suitable coefficient of friction between itself and the parts of hinge assembly 15 with which the shaft interfaces, thereby to facilitate hinged pivotation of arm 17B with respect to hinge bracket 17A, thus with respect to the respective side wall 20A, 20B of trailer 8. Thus, pin shaft 19S is adapted and configured to enable ones of the components of hinge assembly 15 to pivotably actuate with respect to other ones of the components of hinge assembly 15, as desired.

As illustrated, pin head 19H is generally cylindrical, has first and second ends. Pin head 19H extends from the upper end of pin shaft 19S. Each of the first and second terminal ends of pin head 19H extends transversely outwardly beyond the outer circumferential surface of pin shaft 19S.

Accordingly, as illustrated, hinge pin 19 has a generally T-shaped cross-section, or side view. Pin head 19H can be circular, as viewed from above. In such embodiments, pin head 19H extends radially outwardly from the upper end of pin shaft 19S, about substantially the entire circumference of the upper end of the shaft, and transversely beyond the projection of the bore through upper bracket barrel 18A.

The respective members of the hinge assembly 15 are generally made of structural materials such as steel, hard plastic, or the like, such that the distance between pivot pin 19 and arm pin 17C is relatively constant, not subject to substantial variation.

Returning to the conversion apparatus shown in FIG. 2, upper siderail 22A is an elongate, rigid member, having upper and lower surfaces, and is illustrated as a piece of e.g. metal tubing. Upper siderail 22A has a length which corresponds generally to the length of trailer 8, at the respective side wall, and/or corresponds generally to the length of frame rails 12A. Also, each upper siderail 22A extends in a direction which is generally parallel to the direction of extension of frame rails 12A, e.g. generally parallel to the ground and along the length of the trailer 8, and may at least partially define an uppermost edge of convertible trailer 8 at the respective side wall, in the folded-down, stowed configuration of the trailer 8 which is illustrated in e.g. FIG. 2.

As seen in FIG. 2, upper siderail 22A is vertically spaced above side panel 32. In the alternative, side rail 22A can be horizontally spaced from side panel 32. By whatever orientation or direction, upper siderail 22A is spaced from side panel 32, leaving an opening 41 (FIG. 5), extending along the length of the trailer side wall, between the respective sidewall and the respective side rail. The opening 41 is sized, adapted, and configured to, for example, accept components of shelf assembly 25 therein, and/or therethrough.

As illustrated in e.g. FIG. 2, upright supports 21 are shown extending upwardly adjacent the two hinge brackets 17A which are more displaced away from the front and rear of the trailer 8. Upright supports 21 are spaced from sidewall 20A, 20B and are located against the outer edge of lower siderail 22B, thus to define a receiver 42, see FIG. 5. which extends down from opening 41 generally to the upper surface of lower siderail 22B. Sides of receiver 42 are defined laterally by the outer surface of the side wall 20A or 20B, and the respective upright supports 21.

Lower siderail 22B is an elongate, rigid member, and is exemplarily illustrated as a piece of e.g. angle iron metal stock, whereby each lower siderail 22B has an upwardly extending flange, and an outwardly extending flange extending from the upwardly extending flange. Lower siderail 22B has a length which, for example, corresponds generally to the length of trailer 8 and/or to the length of the respective frame rail 12A, and/or the length of the respective upper siderail 22A. Also, each lower siderail 22B extends in a direction which is generally parallel to the direction of extension of frame rails 12A, e.g. generally parallel to the ground, and along the length of the trailer 8.

The upwardly extending flange of each of the lower siderails 22B has an inwardly facing surface and an outwardly facing surface. In the illustrated assemblage of trailer 8, the inwardly facing surface of the upwardly extending portion of a lower siderail 22B is in face to face communication with the outwardly facing surface of side panel 32.

The outwardly extending flange of each of the lower siderails 22B has an upwardly facing surface and a downwardly facing surface. Each lower siderail 22B extends outwardly from the upwardly extending flange in a direction generally parallel to respective ones of side panels 32.

In other words, in the illustrated embodiments, the upwardly and outwardly extending structures of lower siderails 22B generally define L-shaped brackets which are attached to the remainder of convertible trailer 8 e.g. at side panel 32, or through other elements of the trailer box or the trailer running gear 10.

Referring now to FIGS. 2 and 3, front upper rail 22C is an elongate, rigid, member having first and second terminal ends. Upper rail 22C is illustrated in the form of a hollow tube, which extends transversely across the front of the trailer box, at an uppermost portion of the front of the trailer box, and terminates at first and second ends thereof at or adjacent to e.g. sidewalls 20A, 20B. Accordingly, front upper rail 22C, in combination with the upper edges of side walls 20A, 20B, at least partially define the uppermost outer perimeter of the trailer box. Bore 23 extends longitudinally through front upper rail 22C, between the first and second ends of the correspondingly tubular front upper rail Still referring to FIGS. 2 and 3, shelf assembly 25 includes shelf panel 30, see FIG.3, anchor sleeve 35A, outer sleeve 35B, see F*ig*. 3, anchor tube 40A, outer tube 40B, see FIG. 3, and a plurality of anchor bolt assemblies 45.

Referring now to FIG. 2, anchor sleeve 35A has a length and a width. The length of the anchor sleeve 35A corresponds generally in magnitude to the magnitude of the length of shelf panel 30. An opening or bore, e.g. an anchor sleeve opening, extends medially through anchor sleeve 35A, along the entire length of the anchor sleeve 35A. The anchor sleeve opening is adapted and configured to accept and house, for example, an elongate, rigid, member therein, for example, a tube or pipe, which enables the anchor sleeve 35A to be relatively fixedly positioned with respect to trailer 8 as compared to other parts of shelf assembly 25, which are relatively positionally movable with respect to trailer 8.

Shelf panel 30 serves, in the illustrated embodiments, as a cot or bed. Anchor sleeve 35A is shown as an extension of shelf panel 30. Those skilled in the art are well aware of methods of making, and materials suitable for, anchor sleeve 35A and shelf panel 30. As shown, and without limitation, anchor sleeve 35A is integral with shelf panel 30. In such embodiments, anchor sleeve 35A is made by folding a portion of a terminal end of shelf panel 30 over upon itself to form an e.g. flap, and attaching the open end of such flap to shelf panel 30 so as to form the anchor sleeve opening between the flap attachment location and the distal edge of the anchor sleeve 35A. Such attachment, which at least partially defines anchor sleeve 35A, comprehends a variety of suitable attachment methods including, but not limited to, sewing, stitching, adhesive bonding, solvent bonding, ultrasonic bonding, and others. Since anchor sleeve 35A is attached to shelf panel 30, or is integral with shelf panel 30, when a user moves anchor sleeve 35A, the adjacent portions of shelf panel 30 correspondingly move as influenced, at least in part, by the type, direction, and magnitude of movement realized at anchor sleeve 35A.

Referring now to FIG. 2, anchor tube 40A is an elongate, rigid, member, e.g. a length of tubing which is inserted into anchor sleeve 35A. Anchor tube 40A has first and second ends which define a length therebetween. The magnitude of the length dimension of anchor tube 40A is illustrated in the drawings as being greater than the magnitude of the length dimension of anchor sleeve 35A. Accordingly, in the complete assemblage of shelf assembly 25, each of the first and second ends of anchor tube 40A is shown extending beyond the ends of anchor sleeve 35A.

Anchor bolt assemblies 45 extend through anchor tube 40A, and connect anchor tube 40A to lower side rail 22B, thus to fix the maximum vertical distance between anchor tube 40A and lower siderail 22B.

The anchor tube assembly, after insertion into anchor sleeve 35A, is inserted downwardly through opening 41 and into receiver 42, after which anchor bolt assemblies 45A are used to mount the anchor tube 40A to the respective lower side rail 22B whereby the anchor tube 40A and the anchor sleeve 35A are confined in receiver 42, above lower side rail 22B, between the respective sidewall 20A or 20B and the respective upright supports 21 on that respective side of the trailer 8.

Shelf panel 30 is generally rectangular (FIG. 3), and has a length dimension and a width dimension, and is made from a relatively flexible material. Namely, shelf panel 30 is made from, for example, various woven, non-woven, mesh, knitted, netting, cloth, fabric, textile, and/or other material including, but not limited to, canvas, naugahyde, tarp material, and/or other suitable natural, synthetic, semi-synthetic cloths, fabrics, and/or other generally flexible, non-resilient materials.

Figure 5:
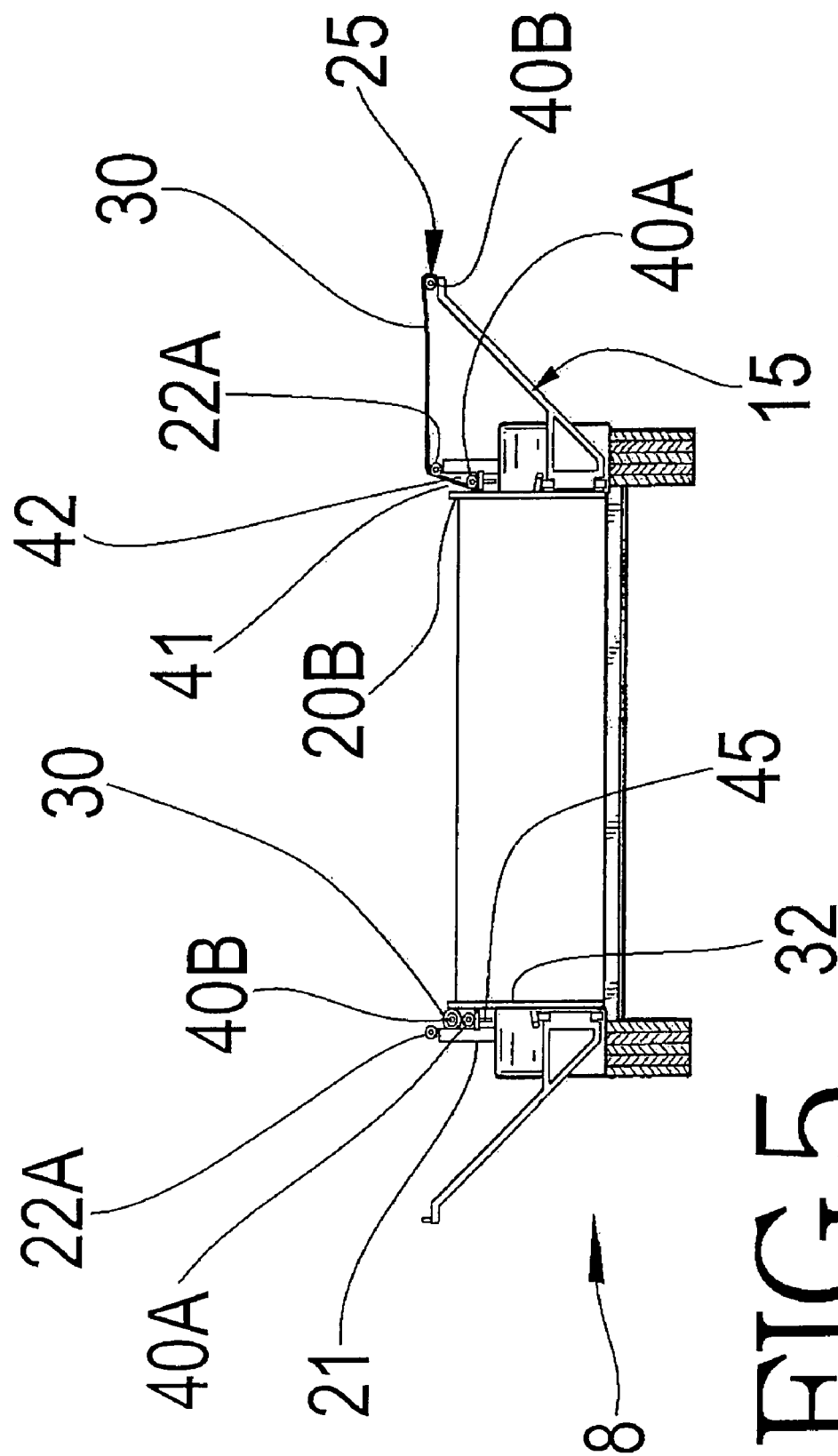
FIG. 5 shows a rear elevation view of a second embodiment of convertible camper-utility trailers of the invention with one shelf assembly set up.

The physical properties and characteristics of shelf panel 30 enable a user to e.g. manipulate shelf assembly 25 for storage by folding, collapsing, wrapping, and/or rolling the shelf panel 30, for example, upon itself. FIG. 5 illustrates two shelf assemblies 25 as viewed from behind trailer 8.

The shelf panel 30 which is illustrated on the left portion of trailer 8 in FIG. 5 is shown in a rolled-up, stowed, e.g. generally cylindrical configuration. In the rolled-up, stowed, generally cylindrical configuration shown, the shelf panel 30, and accompanying outer tube 40B, are disposed and held in receiver 42 (FIG. 2), outwardly of the outer surface of side panel 32 and inwardly of upright supports 21. The shelf panel 30 and outer tube 40B can be stowed elsewhere such as inwardly of the inner surface of sidewall 20A.

The shelf assembly 25 which is illustrated on the right portion of trailer 8, in FIG. 5, is shown in an extended, ready-for-use configuration. When shelf assembly 25 is in the extended, ready-for-use configuration, material of shelf panel 30 extends from anchor sleeve 35A at anchor tube 40A upwardly along receiver 42, through opening 41, wraps around a portion of the outer circumferential surface of upper siderail 22A and correspondingly changes direction of extension, and thus extends outwardly and generally horizontally and away from the trailer box.

Referring now to FIG. 3, outer sleeve 35B has a length dimension which corresponds in magnitude to the magnitude of the length of shelf panel 30. An opening extends through outer sleeve 35B, along the length of the outer sleeve 35B. The outer sleeve opening is adapted and configured to accept and house, for example, an elongate, rigid, member therein. As desired, outer sleeve 35B has one or more slits, holes, and/or other openings which extend for example, through e.g. at least the bottom surface of the outer sleeve 35B and which enable ones of arm pins 17C to pass therethrough.

Like anchor sleeve 35A, those skilled in the art are well aware of methods of making, and materials suitable for, outer sleeve 35B. As one non-limiting example, anchor sleeve 35B is integral with shelf panel 30, and anchor sleeve 35A. In such embodiments, outer sleeve 35B is made by folding a portion of an end of shelf panel 30 over upon itself to form an e.g. flap, and attaching the open end of such flap to shelf panel 30 so as to form the outer sleeve opening between the flap attachment location and the distal edge of the outer sleeve. Such attachment, which at least partially defines outer sleeve 35B, comprehends a variety of suitable attachment methods including, but not limited to, sewing, stitching, adhering, solvent bonding, ultrasonic bonding, and others.

Still referring to FIG. 3, outer tube 40B is an elongate, rigid, member and is adapted and configured for insertion into outer sleeve 35B. Outer tube 40B has first and second ends which define a length therebetween, and upper and lower surfaces. The magnitude of the length dimension of outer tube 40B is optionally greater than the magnitude of the length dimension of outer sleeve 35B. Accordingly, in the complete assemblage of shelf assembly 25, each of the first and second terminal ends of outer tube 40B may extend beyond the ends of anchor sleeve 35A.

A plurality of bores extend transversely through outer tube 40B. Such bores are generally parallel to each other, and spaced along the length of the outer tube 40B. Outer sleeve 35B has a corresponding set of apertures, extending therethrough, at corresponding locations spaced along the length of the outer sleeve 35B. The bores in outer tube 40B define openings having cross-sections sufficiently sized to receive arm pins 17C on hinge arms 17B. Accordingly, the bores of outer tube 40B are each adapted and configured to receive, house, and/or otherwise communicate with, ones of arm pins 17C. Thus, adjacent ones of the bores of outer tube 40B are spaced from each other by distances which correspond to the distances between respective, adjacent, ones of arm pins 17C on adjacent ones of hinge arms 17B, when the hinge arms 17B are pivoted outwardly in their open, usable, positions as shown in top view in FIG. 3, and which also correspond to the spacing of the apertures in outer sleeve 35B. Thus, the bores in outer tube 40B are available to receive pins 17C through the corresponding apertures in the outer sleeve 35B. Restated, the apertures in outer sleeve 35B expose the bores in outer tube 40B for interaction and/or cooperation with pins 17C.

The first and second ends of outer tube 40B can optionally include attachment hardware to attach and/or otherwise connect, for example, the first and second ends of outer tube 40B to rear arms 50A, 50B, front arms 55A, 55B, and/or other components of trailer 8. Those skilled in the art are well aware of suitable hardware 56, and methods of using such hardware, to connect the first and second ends of outer tube 40B to rear arms 50A, 50B, front arms 55A, 55B, and/or other components of convertible trailer 8. Such suitable hardware 56 includes, but is not limited to, various bolts, screws, pins, clips, and/or others.

Referring again to FIG. 2, the anchor bolt assembly 45 includes a bolt which has an elongate and threaded bolt shaft having first and second ends, bolt head 47A, and stop-nut 47B. In the assemblage of convertible trailer 8, each bolt shaft extends through a respective bore of anchor tube 40A, and a corresponding bore which extends through the outwardly extending flange of lower siderail 22B, whereby anchor bolt assembly 45 defines mounting hardware which connects the anchor tube 40A to the lower siderail 22B.

Bolt head 47A has an upper surface and a lower surface, and a width dimension e.g. an outer perimeter, and is attached to the first end of the bolt shaft. The magnitude of the outer diameter of bolt head 47A is greater than the magnitude of the opening defined by the bore in anchor tube 40A, whereby bolt head 47A provides a controlling mechanical interface which generally prevents bolt assembly 45 from "pulling through" the bore of anchor tube 40A. Thus, bolt head 47A is adapted and configured to interface with anchor tube 40A, through the interfacing relationship between the lower surface of bolt head 47A and a portion of the upper surface of anchor tube 40A.

The second end of the bolt shaft, e.g. the "non-bolt head" end, extends through the bore of lower siderail 22B. Stop-nut 47B threadedly engages the second end of the bolt, or other threaded portion of the shaft which extends from the second end of the shaft.

Stop-nut 47B has an upper surface and a lower surface, and a width dimension e.g. an outer perimeter. The size and configuration of the outer perimeter of each stop-nut 47B is greater than the size and configuration of the opening defined by the corresponding bore which extends through lower siderail 22B, whereby stop-nut 47B provides a controlling mechanical interface which generally prevents bolt assembly 45 from pulling through the respective bore of lower siderail 22B. Thus, stop-nut 47B is adapted and configured to interface with lower siderail 22B, through the interfacing relationship between the upper surface of stop-nut 47B and a portion of the lower surface of lower siderail 22B.

The threaded shaft of bolt assembly 45 is sufficiently long to span between anchor tube 40A and lower siderail 22B. The threaded shaft enables a user to (i) draw anchor tube 40A relatively nearer to lower siderail 22B by e.g. tightening stop-nut 47B, or to (ii) move anchor tube 40A relatively further from lower siderail 22B by e.g. loosening stop-nut 47B. Such tightening and loosening of the stop-nut correspondingly tightens and loosens flexible shelf panel 30.

The particular magnitude of the length of the threaded shaft can vary between different configurations of camper-utility trailer assembly 5. As one example, in some embodiments, anchor tube 40A is positioned relatively further from lower siderail 22B and correspondingly the overall length of bolt assembly 45 is relatively greater in magnitude, such as that illustrated in FIG. 2.

As another example, in some embodiments, anchor tube 40A may be positioned relatively nearer to lower siderail 22B and correspondingly the overall length of bolt assembly 45 can be relatively lesser in magnitude, such as that illustrated in FIG. 5.

In any event, with the outer tube 40B mounted on arm pins 17C, the tightness of shelf panel 30 is adjusted by tightening or loosening stop-nuts 47B on bolt assemblies 45. Thus, where the shelf panel 30 is to be used as e.g. a sleeping cot, each user can tighten or loosen the cot fabric thus to adjust the tightness of the cot fabric to his or her liking.

Referring now to FIGS. 2 and 3, rear arm 50A is an elongate, rigid, member which has first and second ends which define a length therebetween. The first end of rear arm 50A has a bore which extends radially therethrough, and rear arm 50A is pivotably attached to the box of trailer 8 by e.g. a mounting pin. Namely, rear arm 50A is pivotably attached to the remainder of trailer 8 at, or adjacent to the uppermost portion of, for example, side wall 20A at the rear of the trailer box.

Thus, for example, rear arm pin 51A is adapted and configured to rotatably, pivotably, and/or otherwise movably, attach rear arm 50A to panel 32. Namely, rear arm pin 51A extends through the bore of the first end of rear arm 50A. The pin shaft has a length sufficiently great in magnitude to extend beyond the lowermost surface of rear arm 50A, which enables the rear arm pin 51 to lock into, thread into, interface with, and/or otherwise attachingly communicate with, receiving structure on e.g. sidewall panel 32.

The cooperation of rear arm pin 51A and the trailer receiving structure enables the rear arm pin 51A to attach rear arm 50A to e.g. the trailer box, and to define a generally vertical axis of pivotation about which arm 50A generally horizontally pivots. FIG. 3 illustrates rear arm 50A pivoted outwardly, about the axis of pivotation defined by rear arm pin 51A, into its usable, non-stowed, configuration and attached, secured, mounted to outer tube 40B by hardware 56.

Still referring to FIGS. 2 and 3, a tent pole collar 52A is generally cylindrical, positioned in a generally upright orientation, and is attached to the second terminal end of rear arm 50A. Bore 60, see FIG. 2, is a through bore which extends axially through the generally upright length of tent pole collar 52A. Tent pole collar 52A and/or bore 60 enables other components of camper-utility trailer assembly 5 to be removably attached to rear arm 50A.

Rear arm 50B is an elongate, rigid, member which has first and second ends which define a length therebetween. The first end of rear arm 50B has a bore which extends radially therethrough, and the arm 50B is pivotably attached to the box of trailer 8 by e.g. a mounting pin. Namely, rear arm 50B is pivotably attached to the remainder of trailer 8 at, or adjacent to the uppermost portion of, for example, side wall 20B at the rear of the trailer box.

Thus, for example, rear arm pin 51B is adapted and configured to rotatably, pivotably, and/or otherwise movably, attach rear arm 50B to side panel 32. Namely, rear arm pin 51B extends through the bore of the first end of rear arm 50B. The pin shaft has a length sufficiently great in magnitude to extend beyond the lowermost surface of rear arm 50B, which enables the rear arm pin 51 to lock into, thread into, interface with, and/or otherwise attachingly communicate with, receiving structure on e.g. sidewall panel 32.

The cooperation of rear arm pin 51B and the trailer receiving structure enables the rear arm pin 51B to attach rear arm 50B to e.g. the trailer box, and to define a generally vertical axis of pivotation about which rear arm 50B generally horizontally pivots. FIG. 3 illustrates rear arm 50B pivoted inwardly, about the axis of pivotation defined by rear arm pin 51B, into its collapsed down, stowed, configuration, e.g. suitable for towing of the trailer 8. Tent pole collar 52B is generally cylindrical, positioned in a generally upright orientation, and is attached to the second end of rear arm 50B. Bore 60 is a through bore which extends axially through the generally upright length of tent pole collar 52B. Tent pole collar 52B and/or bore 60 enables other components of camper-utility trailer assembly 5 to be removably attached to rear arm 50B.

Those skilled in the art are well aware of suitable receiving structure to capture and/or otherwise secure rear arm pins 51A, 51B. Such receiving structure includes, but is not limited to, nuts, captured nuts, threaded bores, cotter pins, keys and keyways, cross-bolts, and/or others.

Still referring to FIG. 3, mounting tabs 62 are adjacent to each of the tent pole collars 52A, 52B, and thus the second terminal ends of rear arms 50A, 50B. Mounting tabs 62 enable components of camper-utility trailer assembly 5, such as trailer enclosure 100, see FIG. 1, to be readily removably attached to the rear arms 50A, 50B. Those skilled in the art are well aware of hardware, and/or other structures suitable for use as mounting tabs 62. These include, but are not limited to, eye-bolts, pieces of piping and/or tubing, depressions, hooks, and/or other recesses, or rope or tie capture structures formed into and/or at rear arms 50A, 50B, and/or others.

Front arms 55A and 55B are elongate, rigid members which have first and second ends and lengths defined therebetween. Each of front arms 55A, 55B has a width which is generally defined by an outer diameter of the arm. The magnitudes of the outer diameters of the front arms 55A, 55B are less than the magnitudes of the opening diameters defined by bore 23. see FIG. 2, which extends through front upper rail 22C. Accordingly, each of front arms 55A, 55B is adapted and configured to be slidably inserted into respective portions of bore 23, e.g. into respective ones of the two ends of upper rail 22C. Namely, the first terminal end of each front arm 55A, 55B, is insertable into a respective end of front upper rail 22C.

Mounting structure, exemplarily illustrated as mounting tabs 62, for at least partially mounting, attaching, and/or otherwise affixing, for example, trailer enclosure 100, see FIG. 1, to convertible trailer 8, is located proximate the second end of each of front arms 55A, 55B. Mounting tabs 62 on front arms 55A, 55B are substantially the same as those on rear arms 50A, 50B. Namely, mounting tabs 62 on front arms 55A, 55B, include, but are not limited to, eye-bolts, pieces of piping and/or tubing, depressions, hooks and/or other recesses or rope or tie capture structure formed into and br at rear arms 50A, 50B, and/or others.

Thus, in the complete assemblage of trailer 8, running gear 10 provides e.g. a skeletal platform, frame, or chassis, the trailer box provides a cargo-hauling body, and conversion apparatus facilitates conversion, from cargo-capable trailer to camper. Accordingly, a plurality of side panels or boards 32 are attached to running gear 10, and at least partially define the bed 20E of the trailer box, sidewalls 20A, 20B of the box, and/or other components of the trailer box. The trailer box of trailer 8 is functionally usable as a cargo-receiving box in a manner similar to the hauling use of a typical utility trailer.

Each shelf assembly 25 is attached to, or otherwise communicates with, respective ones of side panels 32 or running gear 10. Ones of shelf assemblies 25 can be set up such that the trailer 8 is converted from a first, collapsed, closed, stowed, and/or hauling configuration to a second, opened, expanded, camping, and/or set-up configuration.

When trailer 8 is in the second position, optionally with the shelf assemblies mounted on pins 17C, one or more enclosures, e.g. trailer enclosure 100 and/or ground enclosure 200 can be removably attached, assembled, and/or otherwise connected, to trailer 8 as desired.

To convert convertible trailer 8 from the stowed configuration to the set-up configuration, such as in preparation for setting up enclosure 100 over the trailer, the user pivots hinge assemblies 15, namely, hinge arms 17B, horizontally outwardly away from the trailer box as suggested in FIG. 3. Thus, on each side of the trailer 8, the two hinge assemblies 15 in the first pair of hinge assemblies, disposed toward the front of the trailer 8, cooperate with each other, and the two hinge assemblies 15 in the second pair of hinge assemblies1 which are disposed toward the rear of the trailer 8, cooperate with each other.

Conventional hard hinge stops limit the opening swing of each hinge assembly 15 whereby each hinge assembly 15 opens to an included obtuse angle α, relative to the closed, stowed position, of e.g. about 100 degrees to about 135 degrees as suggested in FIG. 3. Thus, the two hinge arms 17B on each pair of hinge assemblies 15 on a given side of the trailer 8, in the set-up configuration, have been opened to obtuse angles wherein the apex of one of the angles points frontwardly and the apex of the other angle points rearwardly.

Given that the distance between the outer pins 17C is fixed, e.g. by outer tube 40B, and with the hinge arms 17B facing at opposing angles, namely at angles of different magnitudes from a common origin against sidewall 20A or 20B, any attempt to swing a hinge arm 17B about its axis of pivotation is resisted by a cooperating second hinge arm which is oriented at a different angle α. Smilarly, where two pairs of hinge arms 17B are so connected to a common longitudinally extending, non-extensible connector, such as tube 40B, and with two hinge arms 17B extending each toward the front and toward the rear, all four hinge arms 17B work together to fix the longitudinal location of the connector e.g. tube 40B such that the tube, in general, cannot move.

Once the hinge arms 17B have been opened to about the desired angles α, the user raises non-extensible outer tube 40B upwardly through receiver 42 and out opening 41,. and pulls the outer tube 40B and correspondingly the material of flexible shelf panel 30, upwardly around and over upper siderail 22A as illustrated in FIG. 5, unrolling the shelf material as needed. The user continues to pull outer tube 40B outwardly and away from the trailer box until outer tube 40B is positioned generally over the outermost portions of hinge arms 17B, thus into proximity to locations over pins 17C. Then outer tube 40B is urged downwardly upon arm pins 17C so that ones of the arm pins 17C are received into corresponding ones of the bores which extend transversely through outer tube 40B, thereby to connect outer tube 40B to the plurality of hinge arms 17B. As necessary, prior to pins 17C being received in the bores, the angles α of respective ones of the hinge arms may be adjusted in order to align pins 17C with the bores. If desired, the above process is repeated on the other side of the trailer 8, so that each of the shelf assemblies 25 is extended outwardly, from trailer sidewalls 20A, and 20B, respectively (FIGS. 1 and 5).

With the hinge assemblies 15 open at opposing obtuse angles α, and with pins 17C received in and/or through generally non-extensible e.g. metal or plastic tube 40B, and given non-extensibility of hinge arms 17B, longitudinal movement of outer tube 40B, along the length direction of the trailer 8, is automatically limited to that movement allowed by the tolerances between pins 17C and the holes within which pins 17C are received. Thus, the opposing angles of arms 17B on a respective side of the trailer 8 relative to the respective side wall of the trailer 8, when the hinge arms 17B are fixed to the fixed location transverse apertures in the outer tube 40B, prevent longitudinal movement of the tube relative to the length of the trailer 8.

The user extends, by pivoting horizontally outwardly, each of rear arms 50A, 50B, and attaches rear arms 50A, 50B to the respective terminal ends of outer tubes 40B, as desired. Then, the user slidably extends, telescopes front arms 55A, 55B from bore 23 of front upper rail 22C. As desired, the user can then attach the respective ends of outer tubes 40B to front arms 55A, 55B using conventional attachment hardware. In this open, set up configuration, trailer 8 is adapted and configured to accept at least one enclosure thereupon or attached thereto in well known manner of attaching a tent to e.g. anchored tent stakes, whereby mounting tabs 62 fill the role of the tent stakes.

Referring now, to FIGS. 1 and 6, trailer enclosure 100 includes a plurality of wall panels 110, a plurality of pole sleeves 120, arcuate poles 140A, 140B, and optionally enclosure tunnel 64. In the exemplary illustration of FIG. 6, enclosure 100 generally includes four wall panels 110. Each of the wall panels 110, in a rest configuration, is flexible, generally planar, and generally triangular, and has a bottom edge and lateral side edges. Adjacent to ones of the wall panels 110 are joined to each other at the respective lateral side edges by, for example, stitching, hook and loop fasteners, adhesive, buttons, zippers, and/or other suitable methods of joinder.

Thus, in the complete assemblage of camper-utility trailer assembly 5, wall panels 110 of trailer enclosure 100, in combination, generally define a dome-type enclosure which encapsulates, superposes, lies over, and/or otherwise at least partially, optionally completely, covers the box of trailer 8. As illustrated in FIGS. 1 and 6, trailer enclosure 100 generally spans between the outermost edges of the extended shelf assemblies 25, on each side of the trailer 8 thus to overlie the cots as well as the trailer bed.

Referring specifically to FIG. 6, each of pole sleeves 120 is an elongate, flexible, generally tubular structure, having a length, and in some embodiments, the pole is made from the same material as wall panels 110. An opening, open at both ends, extends axially through the length of each of the pole sleeves 120. The openings of pole sleeves 120 are adapted and configured to, for example, accept ones of arcuate poles 140A, and 140B therethrough. Pole sleeves 120 are attached to the remainder of trailer enclosure 100 by a sewn, adhesive, and/or other attachment, known to those skilled in the art, between a lateral edge of the respective pole sleeve 120 and, for example, an intersecting seam between adjacent ones of wall panels 110.

At least one of the wall panels 110 has an entrance 130 which extends therethrough. Entrance 130 is a split, and/or other opening which extends generally e.g. through a medial portion of the at least one wall panel 110. Thus, entrance 130 generally divides the respective wall panel 110 into two flaps which can be lifted and/or pulled outwardly away from each other, which enable a user to enter trailer 8 when such trailer 8 is covered by trailer enclosure 100.

The flaps which are defined by entrance 130 are selectably attached to each other, as desired by a user, which enables the trailer enclosure 100 to be closed shut whereby the inside of trailer enclosure 100 is generally closed from the ambient environment which is outside trailer enclosure 100. Such closure presumes use of any closures needed at the front and/or rear walls of the trailer box, thus to largely isolate the inside of the trailer 8 from the outside environment.

Arcuate poles 140A, 140B, are each a generally elongate member with first and second ends, which define a length therebetween. In some embodiments, the arcuate poles 140A and 140B are generally straight, when not under load, and are made from a flexible material. Thus, the arcuate profile of arcuate poles 140A, 140B is defined when the user slidably inserts respective ones of the poles through respective ones of pole sleeves 120, and/or when the user attaches the arcuate poles 140A and 140B to convertible trailer 8. Accordingly, in the complete assemblage of trailer enclosure 100, the arcuate poles 140A and 140B are generally flexed and/or are otherwise conformed to a profile which corresponds to the profile of pole sleeves 12C and thus generally conform to a corresponding profile of the outer surface of trailer enclosure 100.

Those skilled in the art are well aware of suitable materials for, and methods of making, arcuate poles 140A, 140B. Such suitable materials include, but are not limited to, various metallic materials including aluminum, various aluminum alloys, and various non-metallic materials including fiberglass, and various polymeric materials.

When trailer enclosure 100 is attached to convertible trailer 8, each of the ends of each of the arcuate poles 140A, 140B, is attached to respective ones of mounting tabs 62. It should be noted that a typical tent, e.g. a typical dome-style tent, with the bottom wall/floor removed and/or modified, is suitable for use as trailer enclosure 100.

Enclosure tunnel 64 includes tunnel top wall 150A, and tunnel sidewalls 150B, 150C, and extends outwardly from trailer enclosure 100. Each of tunnel top wall 150A, and tunnel sidewalls 150B, 150C are generally flexible, generally planar, e.g. fabric panels. Each of top wall 150A, and tunnel sidewalls 150B, 150C has, e.g. three outer panel edges which define a generally triangular outer perimeter for each of the respective panels.

One outer edge of each of the sidewalls 150B, 150C is connected to a wall panel 110 of trailer enclosure 100, by for example, stitching, hook and loop fasteners, adhesion, buttons, zippers, and/or other suitable methods of joinder.

Two, lateral, outer edges of tunnel top wall 150A are connected to upper edges of sidewalls 150B, 150C, respectively. Thus, three outer edges of tunnel 64, one on each of top wall 150A, and tunnel sidewalls 150B, 150C, remain unattached to trailer enclosure 100, and unattached to each other. These three free outer edges are adapted and configured to attach to, and/or otherwise communicate with, ground enclosure 200 by for example, stitching, hook and loop fasteners, adhesives, buttons, zippers, ties, and/or other suitable methods of joinder.

Referring to FIG. 1, tunnel 64 generally defines a covered pathway which extends between trailer enclosure 100 and ground enclosure 200. And tunnel 64 is adapted and configured to be removably attached to ground enclosure 200 by, for example, corresponding attachment structure on at least one of tunnel 64 and ground enclosure 200. Thus, tunnel 64 enables a user to pass between enclosure 100, over the enclosed trailer, and enclosure 200 which is attached to, but beside, the trailer, generally without exposure to the ambient and/or other environment outside of camper-utility trailer assembly 5. Suitable attachment structure for removably attaching tunnel 64 to ground enclosure 200 includes, but is not limited to stitching, zippers, buttons, hook and loop fasteners, adhesives, ties, and/or other methods of joinder. Tunnel 64 can be made similarly removable from enclosure 100, as desired instead of, or in addition to, the removal from enclosure 200 which is disclosed here.

Figure 7:
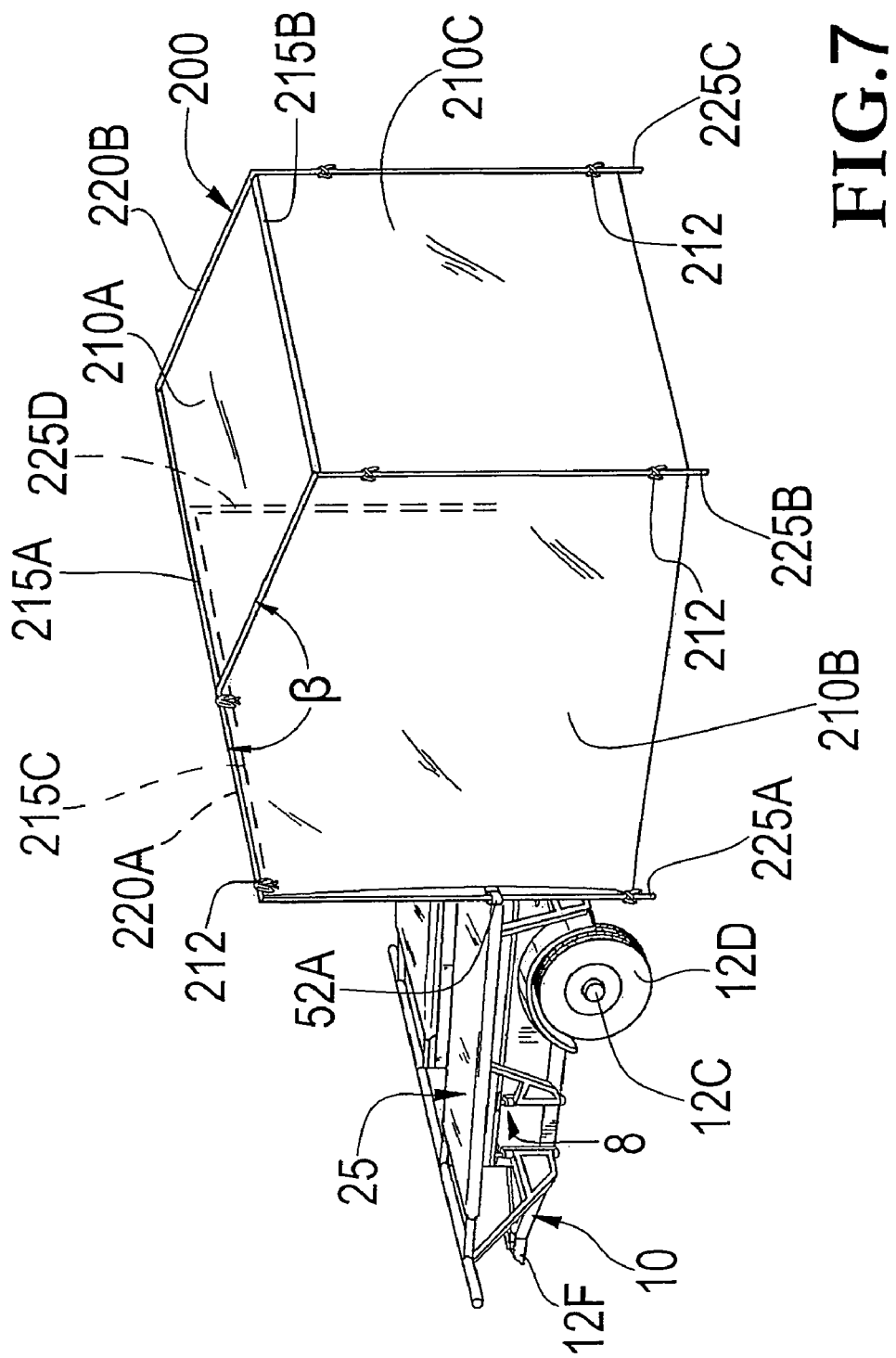
FIG. 7 shows a pictorial view of the embodiment of the convertible camper-utility trailer of FIG. 1, having a single set-up ground enclosure behind and adjacent, and attached to, the trailer.

Referring now to FIGS. 1 and 7, ground enclosure 200 is attached to convertible trailer 8 at rear arms 50A, 50B, and generally defines a tent-type enclosure which encapsulates, superposes, lies over, and/or otherwise at least partially covers a portion of the ground which is adjacent to the trailer 8. Ground enclosure 200 includes a top wall 210A, a plurality of sidewalls e.g. sidewalls 210B, and 210C, ties 212, crossbars 215A, 215B, 215C, gable-bars 220A, 220B, and upright-bars 225A, 225B, 225C, 225D.

Top wall 210A is flexible, generally planar, generally rectangular, has first and second lateral edges, and generally defines an outer perimeter of the enclosure. Top wall 210A is adapted and configured to function as e.g. a roof for ground enclosure 200. In the illustrated embodiment, the medial portion of top wall 210A is generally higher than two of the lateral edges of the perimeter of the top wall. In other words, in use, top wall 210A has a raised central ridge which extends along the middle of the top wall e.g. top wall 210A generally defines an inverted-V configuration.

Two sidewalls, e.g. sidewalls 210B and 210C, are visible in the embodiment illustrated in FIG. 7. However, it should be appreciated that in some embodiments, ground enclosure 200 has, for example, four sidewalls attached to each other and to top wall 210A, thereby to define a substantially closed structure.

Each of sidewalls 210B, 210C, and/or other sidewalls, is flexible, generally planar when set up, generally rectangular, has first and second lateral edges, top and bottom edges, and defines an outer sidewall perimeter. Adjacent ones of sidewalls 210B, 210C, and other sidewalls as are used, are joined to each other at respective lateral edges by for example, stitching, hook and loop fasteners, adhesives, buttons, zippers, ties, and/or other suitable methods of joinder.

The top edges of sidewalls 210B, 210C, and/or other sidewalls, are attached to the outer perimeter edges of top wall 210A. Accordingly, top wall 210A, sidewalls 210B, 210C, and/or other sidewalls, in combination, define a tent-type enclosure which enables a user of camper-utility trailer assembly 5 to remain outside of, and yet have access to, the interior of the trailer 8 while under cover and out of direct contact with the weather, e.g. wind and precipitation.

At least one of the enclosure panels such as top wall 210A and the sidewalls 210B, 210C, optionally has at least one opening which extends therethrough, or at least one door defined therein (not illustrated). Such opening enables a user to enter ground enclosure 200 from outside of camper-utility trailer assembly 5, or to traverse between e.g. trailer 8 and ground enclosure 200.

Each of crossbars 215A, 215B, and 215C is a generally elongate, rigid, member having first and second terminal ends and a length therebetween. In the complete assemblage of ground enclosure 200, crossbars 215A, 215B, and 215C extend generally parallel to each other, and communicate with top wall 210A. Crossbar 215A extends along the highest ridge, portion of top wall 210A. Crossbars 215B and 215C extend along the outer, lateral, edges of top wall 210A. Gable-bars 220A, 220B are each elongate, rigid members, which generally define an inverted-V profile. Thus, gable-bars 220A, 220B each have first and second intersecting portions which intersect at an angle $\beta$, two ends, and an uppermost portion. The first and second intersecting portions extend from the first and second ends, respectively, and join at the locus of intersection approximately mid-way between the first and second ends, e.g. proximate ridge crossbar 215A.

Crossbar 215A extends between, and is attached to, the uppermost portion of gable-bars 220A and 220B. Crossbars 215B, 215C extend between respective ones of the first and second ends of gable-bars 220A, 220B.

Each of upright-bars 225A, 225B, 225C, and 225D, are each an elongate, rigid member having first and second ends. In the complete assemblage of ground enclosure 200, ones of upright-bars 225A, 225B, 225C, and 225D are generally parallel to each other and are positioned and/or oriented generally vertically e.g. perpendicular to the ground.

The first end of each of upright-bars 225A, 225B, 225C, and 225D is attached to a respective one of the intersections of crossbar 215B and gable-bar 220A, crossbar 215B and gable-bar 220B, crossbar 215C and gable-bar 220A, and crossbar 215C and gable-bar 220B. The second end of each of upright-bars 225A, 225B, 225C, and 225D communicates with, and engages, the ground for support of enclosure 200.

Upright-bars 225A and 225C are slidingly inserted into, and housed in, bore 60 which extends through tent-pole collars 52A, 52B (FIG. 3). The interfacing relationship between tent-pole collars 52A, 52B and ones of upright-bars 225A and 225D enables a user to removably attach ground enclosure 200 to convertible trailer 8, whereby the trailer 8 provides lateral support to ground enclosure 200.

Referring now to FIG. 7, ties 212 are e.g. straps which are attached to top wall 210A, sidewalls 210B, 210C, and/or other sidewalls, and enable the top wall 210A and sidewalls 210B and 210C to be attached to ones of crossbars 215A, 215B, 215C, gable-bars 220A, 220B, and upright-bars 225A, 225B, 225C, 225D. Thus, crossbars 215A, 215B, 215C, gable-bars 220A, 220B, and upright-bars 225A, 225B, 225C, 225D, in combination, define a frame which suspends and/or otherwise supports the e.g. fabric panels such as the top wall 210A and sidewalls 210B and 210C of ground enclosure 200, through the attachment of such walls to the frame by ties 212 or other attachment means.

Thus, to complete the assemblage of camper-utility trailer assembly 5, a user opens trailer 8, as described in greater detail elsewhere herein, thus to extend and secure outer tubes 40B in the set up configuration. Rear arm supports 50A, 50B are extended and secured. Front arm supports 55A, 55B are extended if enclosure 100 is to be concurrently used; but may be left stowed if only enclosure 200 is to be currently used. Then the user sets up enclosure 100 or enclosure 200, or both, and attaches the respective enclosure or enclosures to at least part of convertible trailer 8.

To assemble trailer enclosure 100, a user slides arcuate poles 140A, 140B through respective ones of pole sleeves 120. Next, the user inserts, and/or otherwise attaches and secures in conventional manner, each terminal end of arcuate poles 140A, 140B into respective ones of mounting tabs 62, whereby trailer enclosure 100 correspondingly defines a dome-type enclosure, generally over trailer assembly 8.

In addition to assembling the trailer enclosure 100., or in lieu of assembling the trailer enclosure 100, a user can assemble ground enclosure 200. The user slides upright bars 225A, 225D, through tent pole collars 52A, 52B respectively, and/or otherwise attaches upright bars 225A, 225D to rear arms 50A, 50B, or other fixed structure of trailer 8.

The user then assembles the remainder of the ground enclosure bars, e.g. crossbars 215A, 215B, 215C, gable bars 220A, 220B, and upright bars 225B, 225C, to other ones of each other and/or to respective ones of upright bars 225A, 225D.

Figure 8:
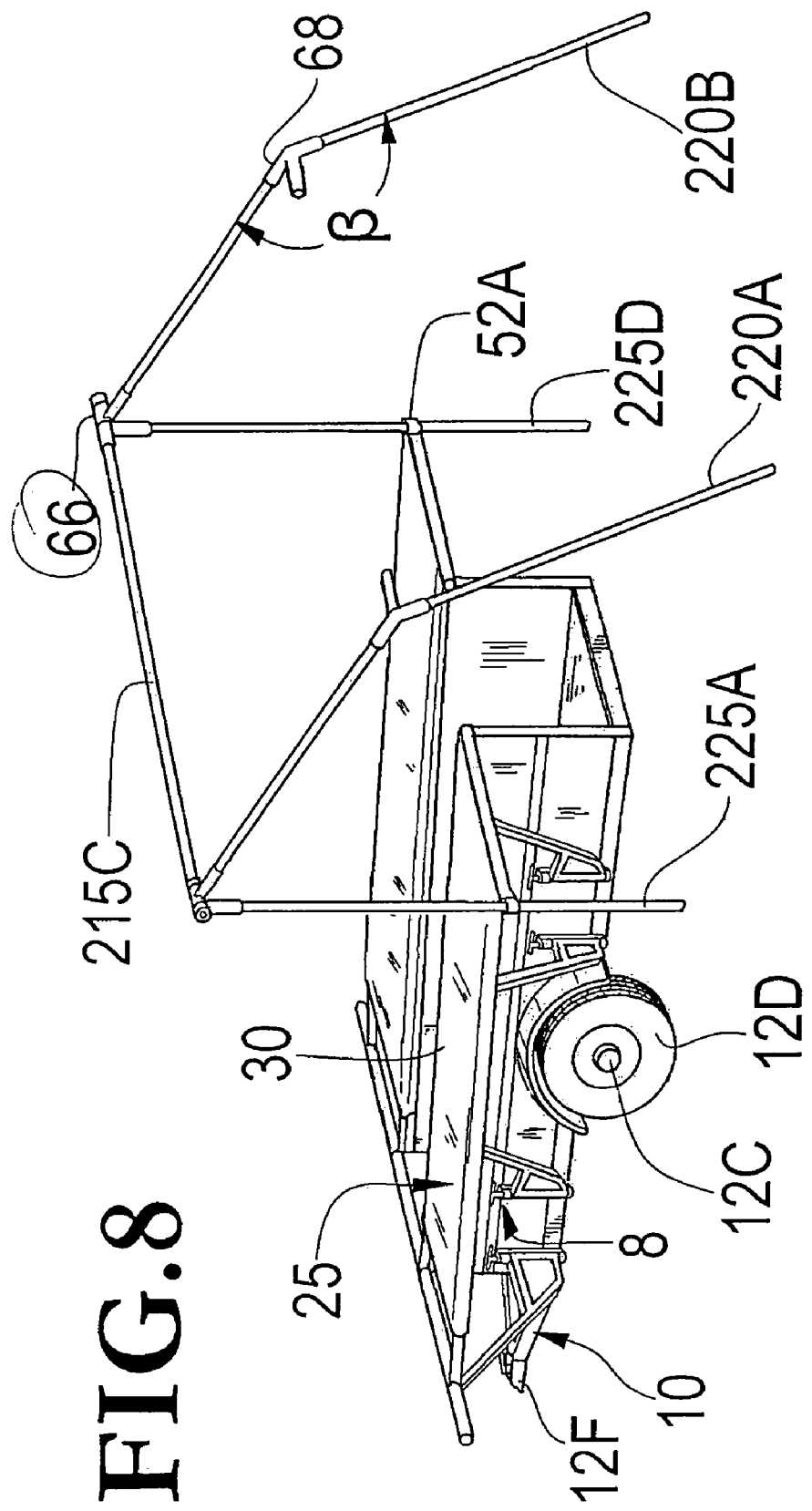
FIG. 8 shows a portion of the frame of the single set-up ground enclosure of FIG. 7, in partially set-up condition.
Figure 9:
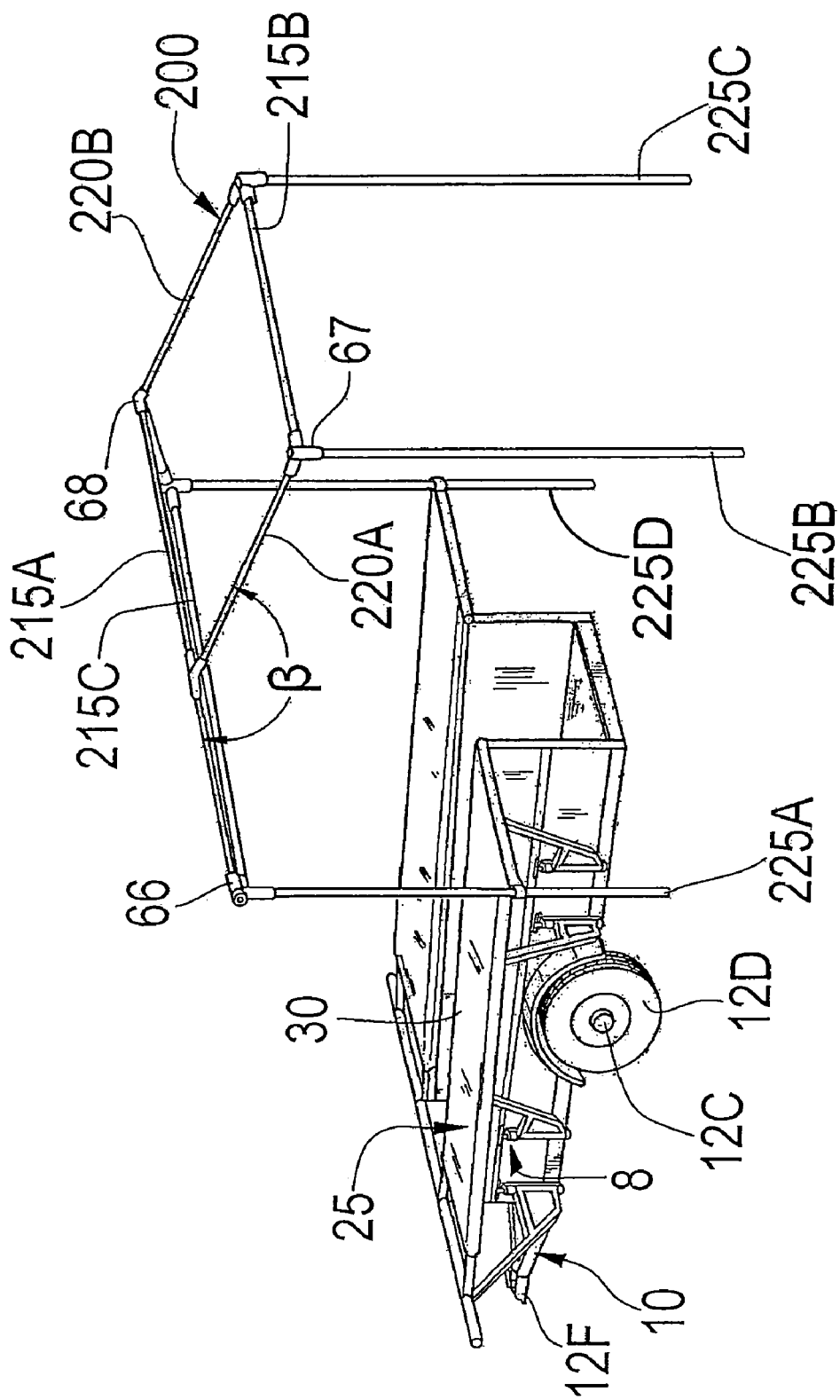
FIG. 9 shows the frame of the single set-up ground enclosure of FIG. 7 in fully set-up condition.

FIG. 8 illustrates the assembly process. Attachment brackets 66 at the tops of the upright bars 225A and 225D accommodate attachment of gable bars 220A, 220B to the upright bars 225A and 225D while enabling pivotation of the gable bars 220A and 220D relative to the upright bars about a horizontal axis of pivotation, while rigidly securing crossbar 215C to the upright bars 225A and 225D. The joinders of the gable bar segments to each other and to crossbars 215A and 215B, as well as to upright bars 225B and 225C, are made with rigid corner brackets 68 and/or corner brackets 67 (FIG. 9). Thus, gable bars 220A and 220B are assembled to cross bars 215A and 215B, not shown, while the joints are within reach from the ground, resulting in the partial set-up of the frame as shown in FIG. 8. At that stage, the brackets which join crossbar 215B to gable bars 220A and 220B, namely corner brackets 67 (FIG. 9) are generally at ground level, and the upright bars 225A and 225D, the crossbars 215A, 215B and 215C and the gable bars 220A and 220B are joined in the assembly except for upright bars 225B and 225C.

One of the ground level brackets, e.g. brackets 67, is then lifted. The assembly is optionally rigid enough that lifting at one corner operates to lift both outer corners to about the same height. As crossbar 215B reaches approximately the height corresponding to the length of upright bars 225B, 225C, one of the respective upright bars, e.g. bar 225B, is inserted into the respective bracket 67 (FIG. 9) at the corner being lifted. The remaining unsupported corner is at that point lifted off the ground, optionally to a similar height as the corner which is now being supported by bar 225B. The remaining unsupported corner is then lifted the remainder of the way to a height sufficient to enable insertion of upright bar 225C into the respective corner bracket 67 (FIG. 9), whereupon the lower end of bar 225C can be placed on the ground, and both bar 225B and 225C are adjusted as necessary so as to be oriented in a desirable upright, e.g. vertical, orientation, thereby completing erection of the frame.

As desired, ones of corner brackets 67 (FIG. 9) are preferably generally fixed, rigid, connectors, similar to rigid corner brackets 68, but optionally can be generally pivotable, similar to attachment brackets 66, optionally other suitable configurations which enable e.g. upright bars 225B, 225C to attach to the crossbar 215B.

FIG. 9 illustrates the fully erected frame of ground enclosure 200. As illustrated, in the complete assemblage of the ground enclosure frame, ones of the crossbars 215A, 215B, 215C, gable-bars 220A, 220B, and upright-bars 225A, 225B, 225C, 225D, and various ones of the connectors, e.g. brackets 66, 67, 68, generally define a skeletal structure upon which ones of the top wall and sidewalls attach and/or otherwise affix. Thus, attachment brackets 66 generally connect the tops of upright bars 225A and 225D, and the ends of gable bars 220A, 220B to respective ends of crossbar 215C. Corner brackets 67, which are rigid, optionally pivotable, connect the tops of upright bars 225B and 225C, and the ends of gable bars 220A, 220B to respective ends of crossbar 215B. And rigid corner brackets 68 generally connect the ends of crossbar 215A to gable bars 220A, 220B, respectively.

Once the frame of ground enclosure 200 is fully erected, the user, using ties 212 or otherwise, ties, straps, lashes, secures, attaches, and/or otherwise connects the e.g. tent fabric or tarp fabric to the various ground enclosure bars. Namely, by means of ties 212 and/or otherwise, the user secures the top wall 210A and the sidewalls 210B and 210C to respective ones of crossbars 215A, 215B, 215C, gable-bars 220A, 220B, and upright-bars 225A, 225B, 225C, 225D.

When convertible trailer 8 is used with both trailer enclosure 100 and ground enclosure 200, a user then attaches, as desired, enclosure tunnel 64 to ground enclosure 200 by means of, for example, zippers, buttons, hook and loop fasteners and/or other connecting means.

Preferably, camper-utility trailer assembly 5 is made of materials which resist corrosion, and are suitably strong and durable for normal extended use while exposed to an outdoor environment. Those skilled in the art are well aware of certain metallic and non-metallic, coated and uncoated, materials which possess such desirable qualities, as well as being aware of appropriate methods of forming such materials, and sources for such materials.

Preferably, certain components of camper-utility trailer assembly 5, e.g. parts of shelf assembly 25, trailer enclosure 100, ground enclosure 200, and/or others, are made from relatively flexible materials including, but not limited to, various woven, non-woven, mesh, knitted, netting, cloth, fabric, textile, and/or other material including, but not limited to, canvas, naugahyde, tarp material, and/or other suitable natural, synthetic, semi-synthetic cloths, fabrics, and/or other generally flexible materials.

Appropriate metallic materials for camper-utility trailer assembly 5 include, but are not limited to, anodized aluminum, aluminum, steel, stainless steel, titanium, magnesium, brass, and their respective alloys. Common industry methods of forming such metallic materials include casting, forging, shearing, bending, machining, riveting, welding, powdered metal processing, extruding and others.

Non-metallic materials suitable for certain components of camper-utility trailer assembly 5, e.g. various bushings, seals, grommets, and other components in axle assembly 12C, wheel/tire assembly 12D, and/or others, are various polymeric compounds, such as for example and without limitation, various of the polyolefins, such as a variety of the polyethylenes, e.g. high density polyethylene, or polypropylenes. There can also be mentioned as examples such polymers as polyvinyl chloride and chlorinated polyvinyl chloride copolymers, various of the polyamides, polycarbonates, and others, as well as various materials generally known as rubbers.

For any polymeric material employed in structures of the invention, any conventional additive package can be included such as, for example and without limitation, slip agents, anti-block agents, release agents, anti-oxidants, fillers, and plasticizers, to control e.g. processing of the polymeric material as well as to stabilize and/or otherwise control the properties of the finished processed product, also to control hardness, bending resistance, and the like.

Common industry methods of forming such polymeric compounds will suffice to form non-metallic components of camper-utility trailer assembly 5. Exemplary, but not limiting, of such processes are the various commonly-known plastics converting processes.

Camper-utility trailer assembly 5 is preferably assembled from a plurality of individual components and sub-assemblies, including but not limited to, running gear 10, hinge assembly 15, shelf assembly 25, elements of the trailer box, trailer enclosure 100, ground enclosure 200, and/or others. Each of the aforementioned sub-assemblies is then assembled to respective other ones of the sub-assemblies or individual components to develop camper-utility trailer assembly 5.

As indicated herein, trailer 8 can be a conventional utility trailer; and enclosures 100 and 200 can be conventional tents which may have been modified to provide for tunnel 64 between the enclosures. Accordingly, trailer 8 can be procured separately as a conventional utility trailer. In some instances, enclosures 100 and 200 can be procured separately. The conversion structure is then added to the trailer, which enables the assembly of the entirety of trailer, the conversion apparatus, and the enclosure or enclosures.

As indicated above, the conversion apparatus includes upper siderails 22A, lower siderails 22B, hinge assemblies 15, and at least one shelf assembly 25, typically two shelf assemblies. Optional apparatus includes front upper rail 22C and front arms 55A, 55B, and rear arms 50A, 50B. In those cases where the front upper rails, the front arms, and/or the rear arms are omitted, the attachment functions, for attaching the enclosures to the trailer 8, can be built into the shelf assemblies 25 namely into outer tubes 40B.

Thus, the camper utility trailer assembly 5 can be procured in three parts, namely the trailer, the tents, and the conversion apparatus. Accordingly, the conversion apparatus can be provided in kit form such that the kit can be used in converting the trailer to receive the enclosures, as well as to provide sleeping cots at shelf panels 30. Such kit includes upper siderails 22A, lower siderails 22B, hinge assemblies 15, and at least one shelf assembly 25, typically two shelf assemblies 25.

Those skilled in the art will now see that certain modifications can be made to the apparatus and methods herein disclosed with respect to the illustrated embodiments, without departing from the spirit of the instant invention. And while the invention has been described above with respect to the illustrated embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

While the present invention is illustrated with reference to camper-trailers having particular configurations and particular features, the present invention is not limited to these configurations or to these features, and other configurations and features can be used.

Similarly, while the disclosure hereof is detailed and exact to enable those skilled in the art to practice the invention, the invention is embodied in other structures in addition to the illustrated exemplary structures. Accordingly, the scope of the invention is defined by the claims appended hereto.

The invention claimed is:

1. A camper-utility trailer assembly which is adapted to be at least temporarily fixed in location, said camper-utility trailer assembly comprising:
 (a) a trailer having a bottom wall, and first and second sidewalls extending generally upwardly from said bottom wall;
 (b) first and second distinct enclosures communicating with said trailer; and
 (c) first and second flexible shelves extending outwardly from proximate said first and second sidewalls,
 said first distinct enclosure generally overlying said trailer and said second distinct enclosure being generally laterally adjacent to said trailer, and said first and second distinct enclosures being releasably attached to each other.

2. A camper-utility trailer assembly as in claim 1, further comprising first and second pivotable hinge arms adapted to be extended, by pivotation, outwardly away from said sidewalls, said trailer comprising at least one flexible shelf removably attached to said pivotable hinge arms so as to extend generally outwardly away from ones of said trailer sidewalls.

3. A camper-utility trailer assembly as in claim 1, said at least one flexible shelf being movable between a relatively stowed position and a relatively set-up position, and being adapted and configured to be generally longitudinally rolled about itself so as to be rolled up as said flexible shelf is being moved from such set-up position to such stowed position.

4. A camper-utility trailer assembly as in claim 1 wherein said first enclosure overlies a major portion of said bottom wall of said trailer.

5. A camper-utility trailer assembly as in claim 1, comprising an enclosure tunnel generally extending between and connecting said first and second enclosures to each other.

6. A camper-utility trailer assembly which is adapted to be at least temporarily fixed in location, said camper-utility trailer assembly comprising:
a) a trailer having a bottom wall, and first and second sidewalls extending generally upwardly from said bottom wall;
b) an enclosure communicating with said utility trailer, said enclosure generally overlying a major portion of said bottom wall and being supported in part by said trailer, a portion of said enclosure extending beyond said trailer and being supported from the ground adjacent to said trailer; and
c) at least one flexible shelf, which can be rolled up on itself, and which extends, from a stowage configuration in a receiver adjacent to one of said first and second sidewalls, to a set-up configuration wherein said flexible shelf extends outwardly from one of said first and second sidewalls to a support arm which is displaced outwardly from said respective sidewall of said trailer.

7. A camper-utility trailer combination which is adapted to be at least temporarily fixed in location, said camper-utility trailer comprising:
a) a trailer including a running gear, a trailer body, and a first enclosure attachment structure, said first enclosure attachment structure including a pass-through receptacle; and
b) a ground enclosure, adapted to be erected on the ground at a location generally laterally displaced from said trailer, said ground enclosure including a second enclosure attachment structure in the form of a bar adapted to cooperate with said pass-through receptacle to facilitate attachment of said ground enclosure to said trailer at a location generally laterally displaced from said trailer, and wherein said trailer provides lateral support to said ground enclosure.

8. The camper-utility trailer combination of claim 7 wherein said ground enclosure includes a pole-based frame, and a fabric-based side wall and/or top wall.

9. The camper-utility trailer combination of claim 7 wherein said pass-through receptacle includes a collar and said bar, when said camper-utility trailer combination is set up, passes through said collar.

10. The camper-utility trailer combination of claim 9 wherein, when said camper-utility trailer combination is set up, said bar includes an upright bar disposed in a generally upright orientation.

11. The camper-utility trailer combination of claim 10 further comprising at least one top bar, and a pivot bracket which enables pivotation of said at least one top bar relative to said upright bar.

12. The camper-utility trailer combination of claim 11 wherein said pivot bracket enables pivotation of said at least one top bar about a horizontal axis, relative to said upright bar.

13. The camper-utility trailer combination of claim 12 wherein said at least one top bar comprises a gable bar.

14. The camper-utility trailer combination of claim 7, said trailer comprising first and second ones of said first enclosure attachment structures, and wherein, when said camper-utility trailer combination is set up, said ground enclosure comprises at least first and second said upright bars extending through said first and second ones of said first enclosure attachment structure, first and second pivot brackets are mounted to said first and second upright bars, and at least first and second top bars are mounted to said first and second pivot brackets7 and pivot about said upright bars.

15. The camper-utility trailer combination of claim 14 wherein said at least first and second top bars pivot about said upright bars with respect to a horizontal axis of pivotation.

16. The camper-utility trailer combination of claim 14 further comprising third and fourth upright bars connected to ones of said top bars by third and fourth brackets.

17. The camper-utility trailer combination of claim 16 wherein said third and fourth brackets enable pivotation of said third and fourth upright bars relative to ones of said top bars.

18. The camper-utility trailer combination of claim 17 wherein said top bars include gable bars which are connected to each other, so as to act together, by one or more cross bars.

19. The camper-utility trailer combination of claim 18 wherein said ground enclosure further comprises at least one fabric-based side wall or top wall.

20. The camper-utility trailer combination of claim 19 wherein said ground enclosure is generally enclosed on all side walls and a top wall thereby to provide a generally enclosed enclosure.

21. The camper-utility trailer combination of claim 20 further comprising, when said camper-utility trailer combination is set up, a second enclosure generally overlying said trailer.

22. The camper-utility trailer combination of claim 21 wherein said first and second enclosures are releasably attached to each other.

23. The camper-utility trailer combination of claim 22 further comprising an enclosure tunnel generally extending between said first and second enclosures and connecting said first and second enclosures to each other.

24. The camper-utility trailer combination of claim 20 wherein said ground enclosure comprises a tent.

25. The camper-utility trailer combination of claim 21 wherein said first and second enclosures comprise tents.

* * * * *